(12) United States Patent
Sutton et al.

(10) Patent No.: US 8,248,499 B2
(45) Date of Patent: Aug. 21, 2012

(54) CURVILINEAR SENSOR SYSTEM

(76) Inventors: Gary Edwin Sutton, La Jolla, CA (US); Douglas Gene Lockie, Los Gatos, CA (US)

( * ) Notice: Subject to any disclaimer, the term of this patent is extended or adjusted under 35 U.S.C. 154(b) by 297 days.

(21) Appl. No.: 12/655,819

(22) Filed: Jan. 6, 2010

(65) Prior Publication Data

US 2010/0260494 A1 Oct. 14, 2010

Related U.S. Application Data

(60) Provisional application No. 61/208,456, filed on Feb. 23, 2009.

(51) Int. Cl.
H04N 3/14 (2006.01)
(52) U.S. Cl. .......................................... 348/294
(58) Field of Classification Search .................... 348/294
See application file for complete search history.

(56) References Cited

U.S. PATENT DOCUMENTS

| | | | |
|---|---|---|---|
| 6,455,831 B1 | 9/2002 | Bandera | |
| 6,489,992 B2 | 12/2002 | Savoye | |
| 7,110,033 B2 | 9/2006 | Miyake | |
| 7,162,806 B1 | 1/2007 | Swiggart | |
| 7,196,391 B2 | 3/2007 | Hsieh | |
| 7,277,242 B1 | 10/2007 | Wang | |
| 7,294,828 B2 | 11/2007 | Kinoshita | |
| 7,507,944 B1 * | 3/2009 | Arnzen et al. | 250/208.1 |
| 8,077,235 B2 * | 12/2011 | Street | 348/294 |
| 2001/0020671 A1 | 9/2001 | Ansorge | |
| 2002/0154239 A1 | 10/2002 | Fujimoto | |
| 2003/0141433 A1 * | 7/2003 | Gordon | 250/208.1 |
| 2003/0179303 A1 | 9/2003 | Bittner | |
| 2004/0056971 A1 * | 3/2004 | Yang et al. | 348/294 |
| 2004/0095492 A1 | 5/2004 | Baxter | |
| 2005/0030408 A1 | 2/2005 | Ito | |
| 2005/0268521 A1 | 12/2005 | Cox | |
| 2006/0109367 A1 | 5/2006 | Hirooka | |
| 2006/0291844 A1 | 12/2006 | Kakkori | |
| 2007/0133977 A1 | 6/2007 | Mayumi | |
| 2007/0166027 A1 | 7/2007 | Misawa | |
| 2007/0188650 A1 | 8/2007 | Kobayashi | |
| 2008/0151089 A1 | 6/2008 | Street | |
| 2008/0259194 A1 | 10/2008 | Silverstein | |
| 2009/0115875 A1 * | 5/2009 | Choi et al. | 348/294 |

FOREIGN PATENT DOCUMENTS

| | | |
|---|---|---|
| CA | 2 570 955 | 6/2008 |
| DE | 31 06 636 | 3/1982 |
| EP | 786 815 | 7/1997 |
| EP | 0 973 122 | 1/2000 |

(Continued)

OTHER PUBLICATIONS

Rim, The Optical Advantages of Curved Focal Plane Arrays, Optics Express, Mar. 31, 2008, pp. 4965-4971, vol. 16, No. 7, USA.

(Continued)

*Primary Examiner* — James Hannett
(74) *Attorney, Agent, or Firm* — Thomas N. Giaccherini

(57) ABSTRACT

Methods and apparatus for a Curvilinear Sensor System are disclosed. The present invention includes a wide variety of generally curved, aspheric or non-planar arrangement of sensors and their equivalents. The curvilinear surfaces, edges or boundaries that define the geometry of the present invention may be continuous, or may be collections or aggregations of many small linear, planar or other segments which are able to approximate a curved line or surface.

19 Claims, 29 Drawing Sheets

FOREIGN PATENT DOCUMENTS

| | | |
|---|---|---|
| EP | 1 333 498 | 8/2003 |
| FR | 2 830 128 | 9/2001 |
| WO | WO 2006 116 268 | 11/2006 |
| WO | WO 2007 058728 | 5/2007 |
| WO | WO 2008 041739 | 10/2008 |
| WO | WO 2009 21 1224 | 2/2009 |
| WO | WO 2009 022 178 | 2/2009 |

OTHER PUBLICATIONS

Park, Super-Resolution Image Reconstruction, IEEE Signal Processing Magazine, May 2005, pp. 21-36, vol. 20, No. 3, USA.

Scheffer, Log Polar Image Sensor in CMOS Technolgy, SPIE, Jun. 10, 1996, pp. 2-11, vol. 2784, USA.

* cited by examiner

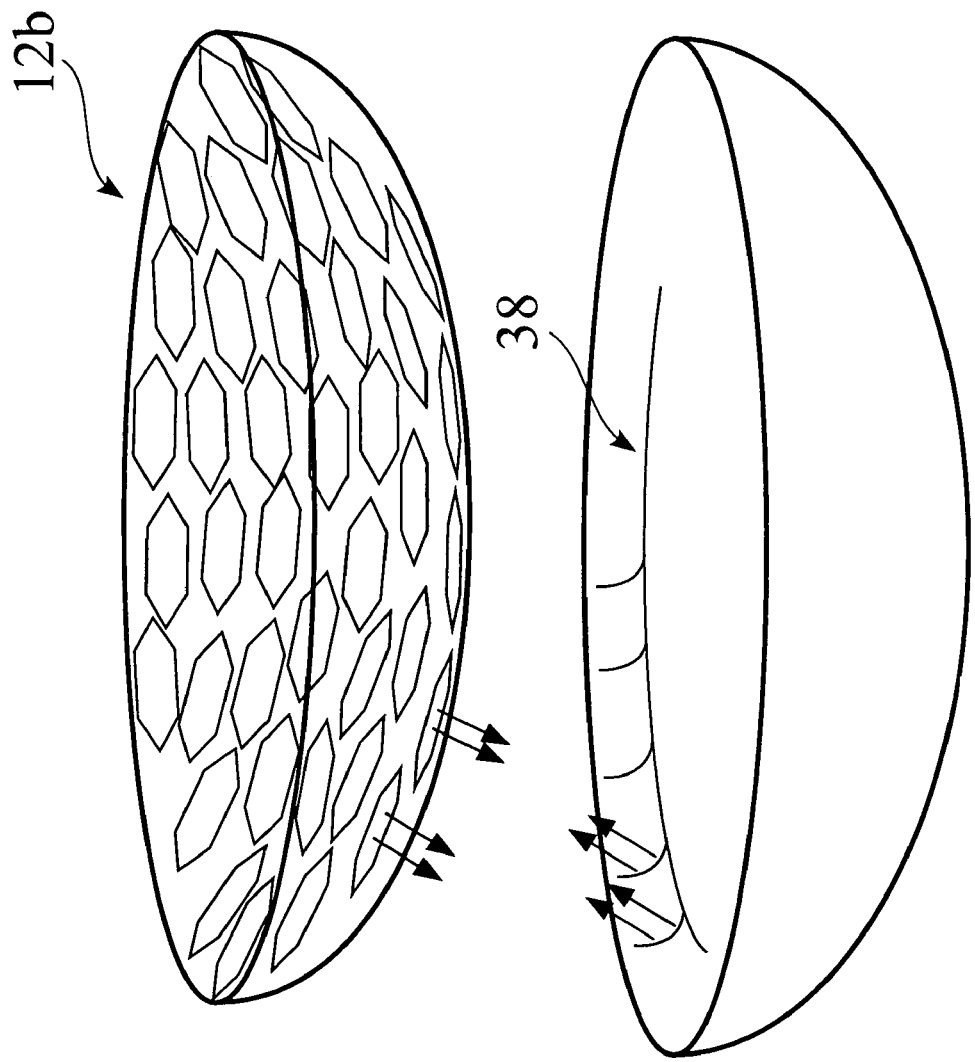

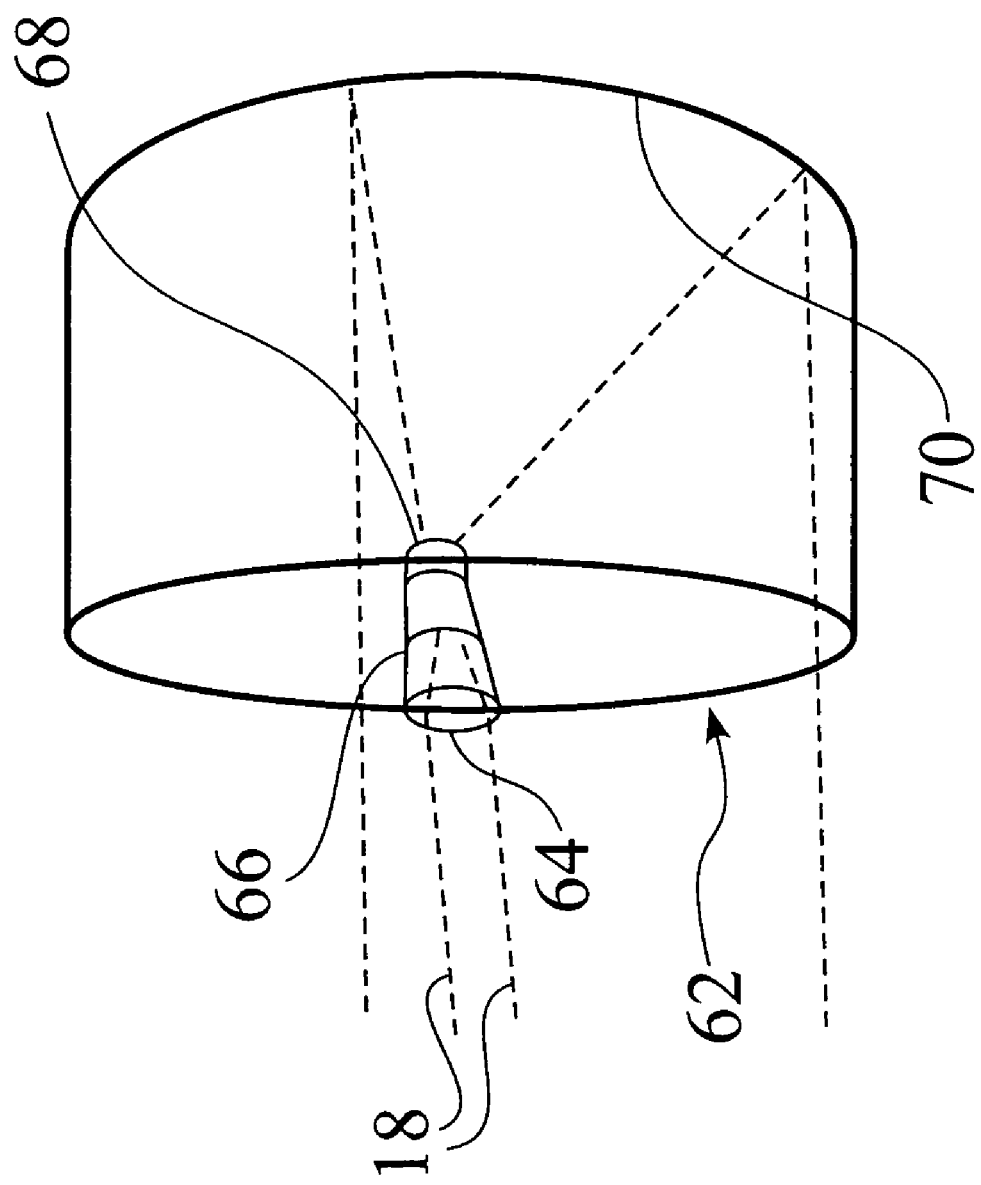

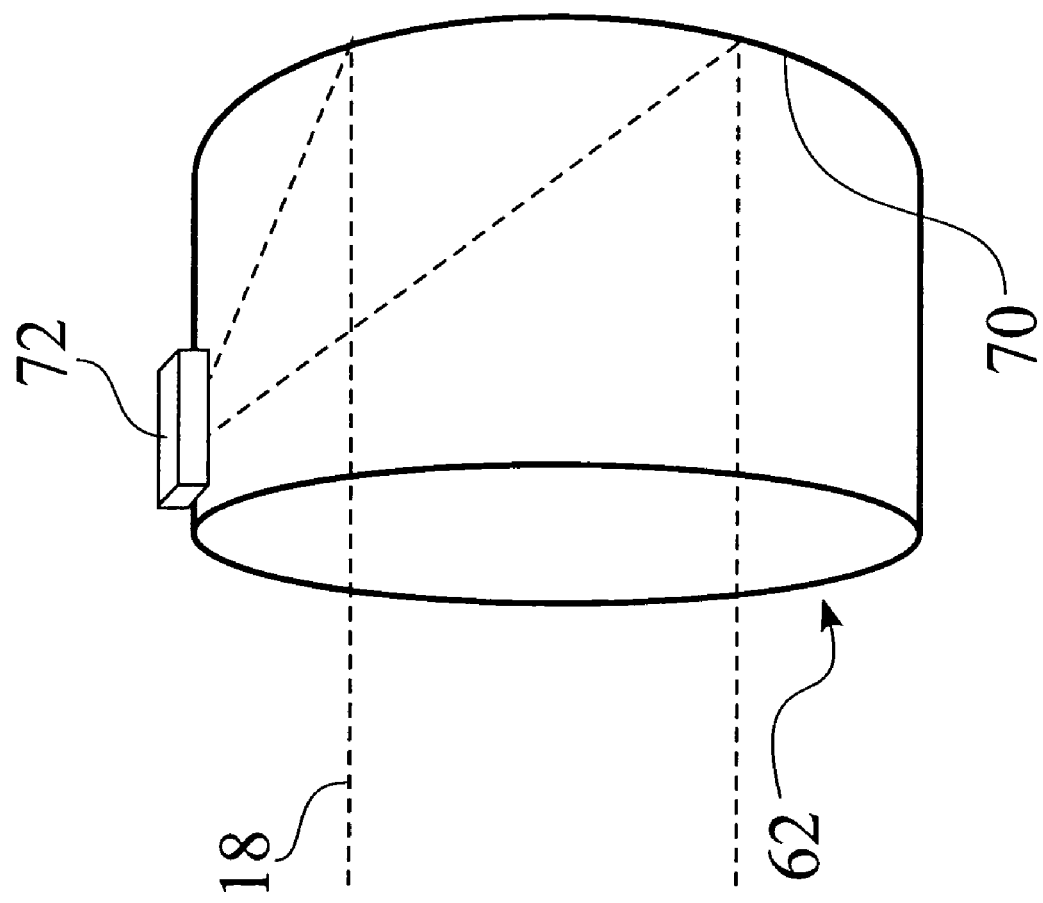

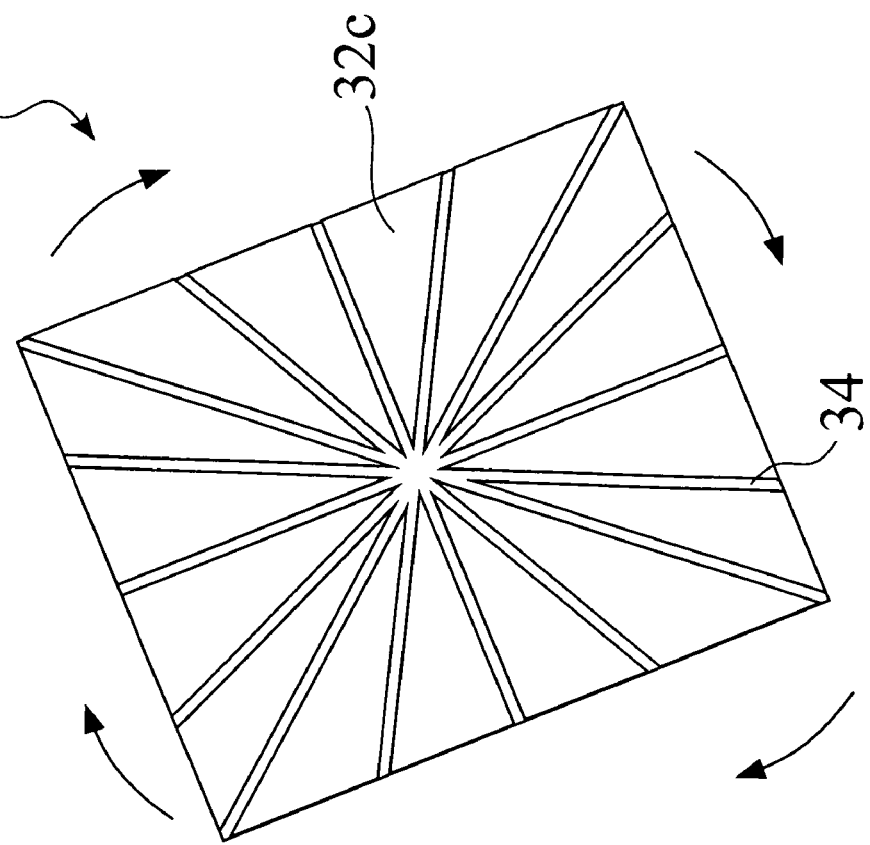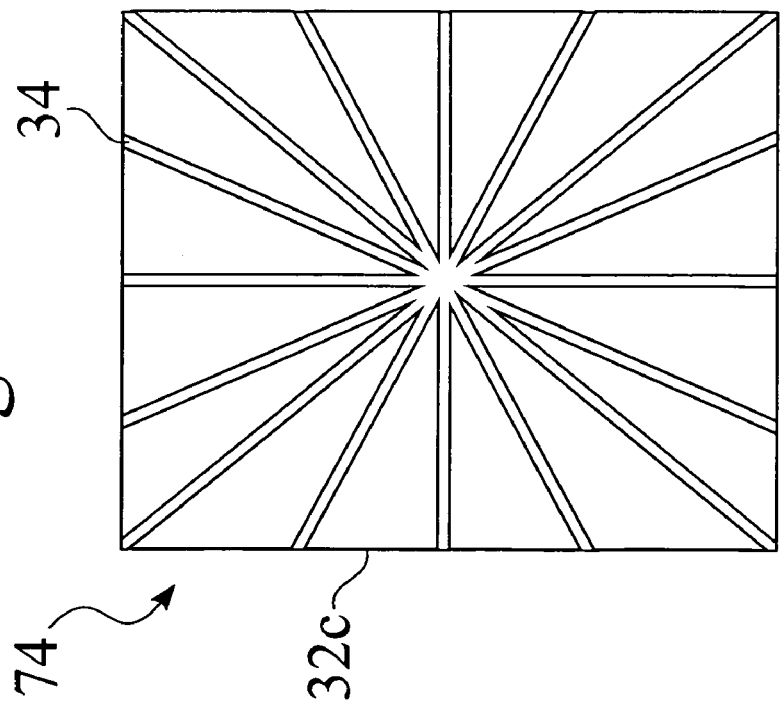

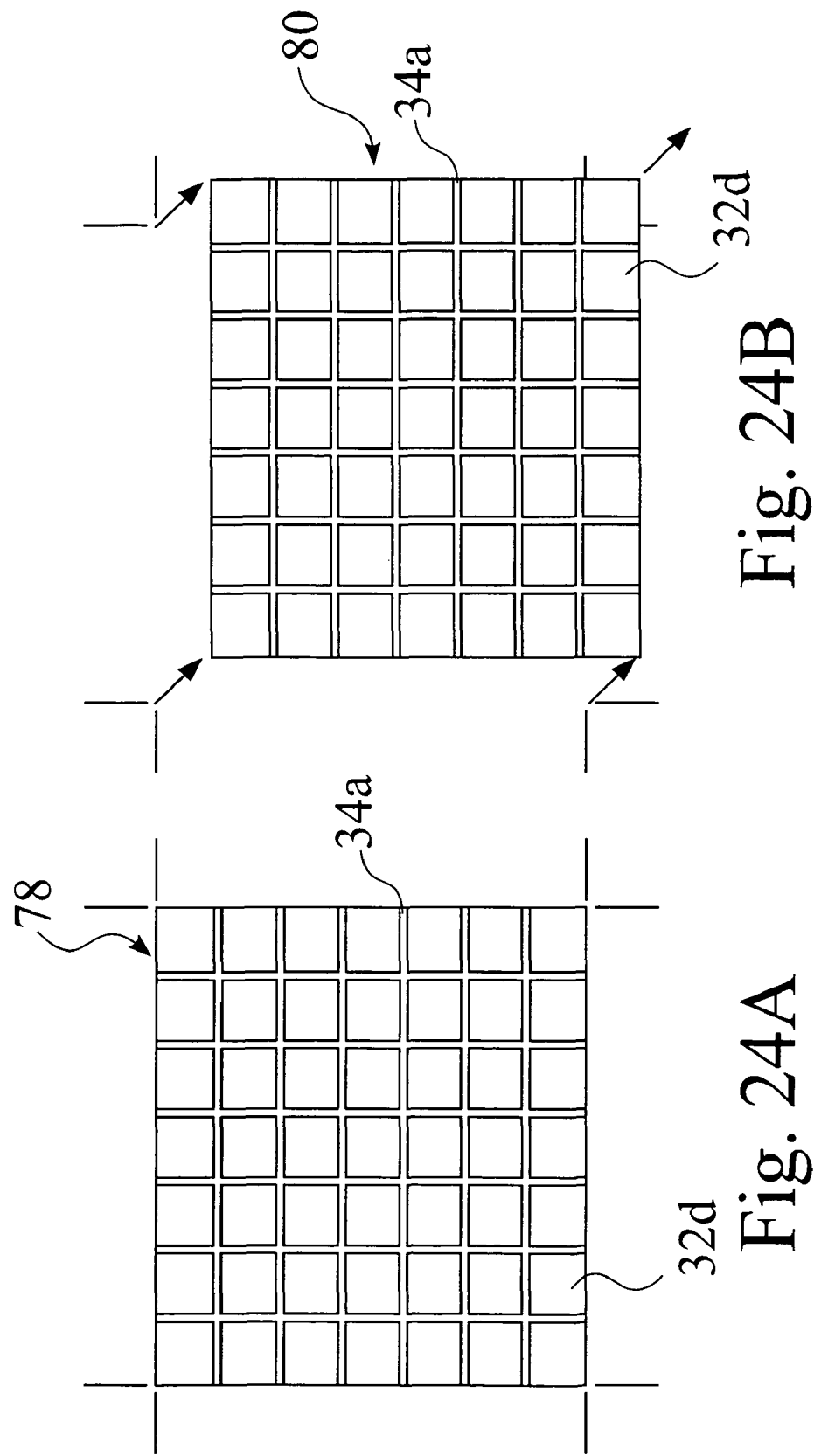

CURVILINEAR SENSOR SYSTEM

CROSS-REFERENCE TO RELATED PENDING PATENT APPLICATIONS & CLAIMS FOR PRIORITY

The Present application is related to Provisional Patent Application 61/208,456, filed on 23 Feb. 2009. The Applicants claim the benefit of priority for any and all subject matter which is commonly disclosed in the Present patent application, and in the Provisional Patent Application.

FIELD OF THE INVENTION

The present invention relates to imaging and sensors. More particularly, one embodiment of the present invention may be used in a digital camera to provide enhanced photographic capabilities.

FEDERALLY SPONSORED RESEARCH OR DEVELOPMENT

None.

BACKGROUND OF THE INVENTION

A Brief History of Cameras
Evolution of the Three Primary Camera Types

Current photographic cameras evolved from the first "box" and "bellows" models into three basic formats by the late twentieth century.

The rangefinder came first. It was followed by the SLR, or, single lens reflex and finally the Compact "Point and Shoot" cameras. Most portable cameras today use rangefinder, SLR or "Point and Shoot" formats.

Simple Conventional Cameras

FIG. 1 is a simplified view of a conventional camera, which includes an enclosure, an objective lens and a flat section of photographic film or a flat sensor.

A simple lens with a flat film or sensor faces several problems. Light travels over a longer pathway to the edges of the film or the sensor's image area, diluting those rays. Besides being weaker, as those rays travel farther to the sensor's edges, they suffer more "rainbow effect," or chromatic aberration.

FIG. 2 presents a simplified view of the human eye, which includes a curved surface for forming an image. The human eye, for example, needs only a cornea and a single lens to form an image. But on average, one human retina contains twenty-five million rods and six million cones. Today's high end cameras use lenses with from six to twenty elements. Only the rarest, most expensive cameras have as many pixels as the eye has rods and codes, and none of these cameras capture images after sunset without artificial light.

The eagle's retina has eight times as many retinal sensors as the human eye. They are arranged on a sphere the size of a marble. The eagle's rounded sensors make simpler optics possible. No commercially available camera that is available today has a pixel count which equals a fourth of the count of sensors in an eagle's eye. The eagle eye uses a simple lens and a curved retina. The best conventional cameras use multiple element lenses with sophisticated coatings, exotic materials and complex formulas. This is all to compensate for their flat sensors. The eagle sees clearly at noon, in daylight or at dusk with simpler, lighter and smaller optics than any camera.

Rangefinder Cameras

Rangefinder cameras are typified by a broad spectrum from the early LEICA™ thirty-five millimeter cameras, for professionals, to the later "INSTAMATIC™" film types for the masses. (Most of KODAK's™ INSTAMATIC™ cameras did not focus, so they were not true rangefinders. A few "Instamatic type" models focused, and had a "viewing" lens separated from the "taking" lens, qualifying them as rangefinders.)

Rangefinder cameras have a "taking" lens to put the image on the film (or sensor today) when the shutter opens and closes; mechanically or digitally. These cameras use a second lens for viewing the scene. Focusing takes place through this viewing lens which connects to, and focuses, the taking lens.

Since the taking lens and the viewing lens are different, and have different perspectives on the scene being photographed, the taken image is always slightly different than the viewed image. This problem, called parallax, is minor in most situations but becomes acute at close distances.

Longer telephoto lenses, which magnify more, are impractical for rangefinder formats. This is because two lenses are required, they are expensive and require more side-to-side space than exists within the camera body. That's why no long telephoto lenses exist for rangefinder cameras.

Some rangefinder cameras use a frame in the viewfinder which shifts the border to match that of the taking lens as the focus changes. This aligns the view with the picture actually taken, but only for that portion that's in focus. Backgrounds and foregrounds that are not in focus shift, so those parts of the photographed image still vary slightly from what was seen in the viewfinder.

A few rangefinder cameras do exist that use interchangeable or attachable lenses, but parallax remains an unsolvable problem and so no manufacturer has ever introduced a rangefinder camera with much beyond slightly wide or mildly long telephoto accessories. Any added rangefinder lens must also be accompanied by a similar viewfinder lens. If not, what is viewed won't match the photograph taken at all. This doubles the lens cost.

A derivation of the rangefinder, with the same limitations for accessory lenses, was the twin lens reflex, such as those made by ROLLEI-WERKE™ cameras.

Compact, or "Point and Shoot" Cameras

Currently, the most popular format for casual photographers is the "Point and Shoot" camera. They emerged first as film cameras but are now nearly all digital. Many have optical zoom lenses permanently attached with no possibility for interchanging optics. The optical zoom, typically, has a four to one range, going from slight wide angle to mild telephoto perspectives. Optical zooms don't often go much beyond this range for acceptable results and speed. Some makers push optical zoom beyond this four to one range, but the resulting images and speeds deteriorate. Others add digital zoom to enhance their optical range; causing results that most trade editors and photographers currently hate, for reasons described in following paragraphs.

There are no "Point and Shoot" cameras with wide angle lenses as wide as the perspective are for an eighteen millimeter SLR lens (when used, for relative comparison, on the old standard thirty-five millimeter film SLR cameras.) There are no "Point and Shoot" cameras with telephoto lenses as long as a two hundred millimeter SLR lens would have been (if on the same old thirty-five millimeter film camera format.) Today, more photographs are taken daily by mobile phones and PDAs than by conventional cameras. These will be included in the references herein as "Point and Shoot Cameras."

Single Lens Reflex (SLR) Cameras

Single lens reflex cameras are most commonly used by serious amateurs and professionals today since they can use wide selections of accessory lenses.

With 35 mm film SLRs, these lenses range from 18 mm "fisheye" lenses to 1,000 mm super-telephoto lenses, plus optical zooms that cover many ranges in between.

With SLRs there's a mirror behind the taking lens which reflects the image into a viewfinder. When the shutter is pressed, this mirror flips up and out of the way, so the image then goes directly onto the film or sensor. In this way, the viewfinder shows the photographer almost the exact image that will be taken, from extremes in wide vistas to distant telephoto shots. The only exception to an "exact" image capture comes in fast action photography, when the delay caused by the mirror movement can result in the picture taken being slightly different than that image the photographer saw a fraction of a second earlier.

This ability to work with a large variety of lenses made the SLR a popular camera format of the late twentieth century, despite some inherent disadvantages.

Those SLR disadvantages are the complexity of the mechanism, requiring more moving parts than with other formats, plus the noise, vibration and delay caused by the mirror motion. Also, lens designs are constrained, due to the lens needing to be placed farther out in front of the path of the moving mirror, which is more distant from the film or sensor, causing lenses to be heavier, larger and less optimal. There is also the introduction of dust, humidity and other foreign objects into the camera body and on the rear lens elements when lenses are changed.

Dust became a worse problem when digital SLRs arrived, since the sensor is fixed, unlike film. Film could roll away the dust speck so only one frame was affected. With digital cameras, every picture is spotted until the sensor is cleaned. Recent designs use intermittent vibrations to clear the sensor. This doesn't remove the dust from the camera and fails to remove oily particles. Even more recent designs, recognizing the seriousness of this problem, have adhesive strips inside the cameras to capture the dust if it is vibrated off from the sensor. These adhesive strips, however, should be changed regularly to be effective, and, camera users typically would require service technicians to do this.

Since the inherent function of an SLR is to use interchangeable lenses, the problem continues.

Extra weight and bulk are added by the mirror mechanism and viewfinder optics to SLRs. SLRs need precise lens and body mounting mechanisms, which also have mechanical and often electrical connections between the SLR lens and the SLR body. This further adds weight, complexity and cost.

Some of these "vibration" designs assume all photos use a horizontal format, with no adhesive to catch the dust if the sensor vibrates while in a vertical position, or, when pointed skyward.

Optical Zoom Lenses

Optical zoom lenses reduce the need to change lenses with an SLR. The photographer simply zooms in or out for most shots. Still, for some situations, an even wider or longer accessory lens is required with the SLR, and the photographer changes lenses anyway.

Many "Point and Shoot" cameras today have zoom lenses as standard; permanently attached. Nearly all SLRs offer zoom lenses as accessories. While optical technology continues to improve, there are challenges to the zoom range any lens can adequately perform. Other dilemmas with zoom lenses are that they are heavier than their standard counterparts, they are "slower," meaning less light gets through, limiting usefulness, and zoom lenses never deliver images that are as sharp or deliver the color fidelity as a comparable fixed focal length lens. And again, the optical zoom, by moving more elements in the lens, introduces more moving parts, which can lead to mechanical problems with time and usage, plus added cost. Because optical zooms expand mechanically, they also function like an air pump, sucking in outside air while zooming to telephoto and squeezing out air when retracting for wider angle perspectives. This can introduce humidity and dust to the inner elements.

The development of a system with a sensor that reduces these problems would constitute a major technological advance, and would satisfy long-felt needs in the imaging business.

SUMMARY OF THE INVENTION

The present invention comprises methods and apparatus for a non-planar sensor that may be incorporated into a camera or some other suitable radiation gathering device that will provide enhanced optical performance.

A BRIEF DESCRIPTION OF THE DRAWINGS

Figure 1:
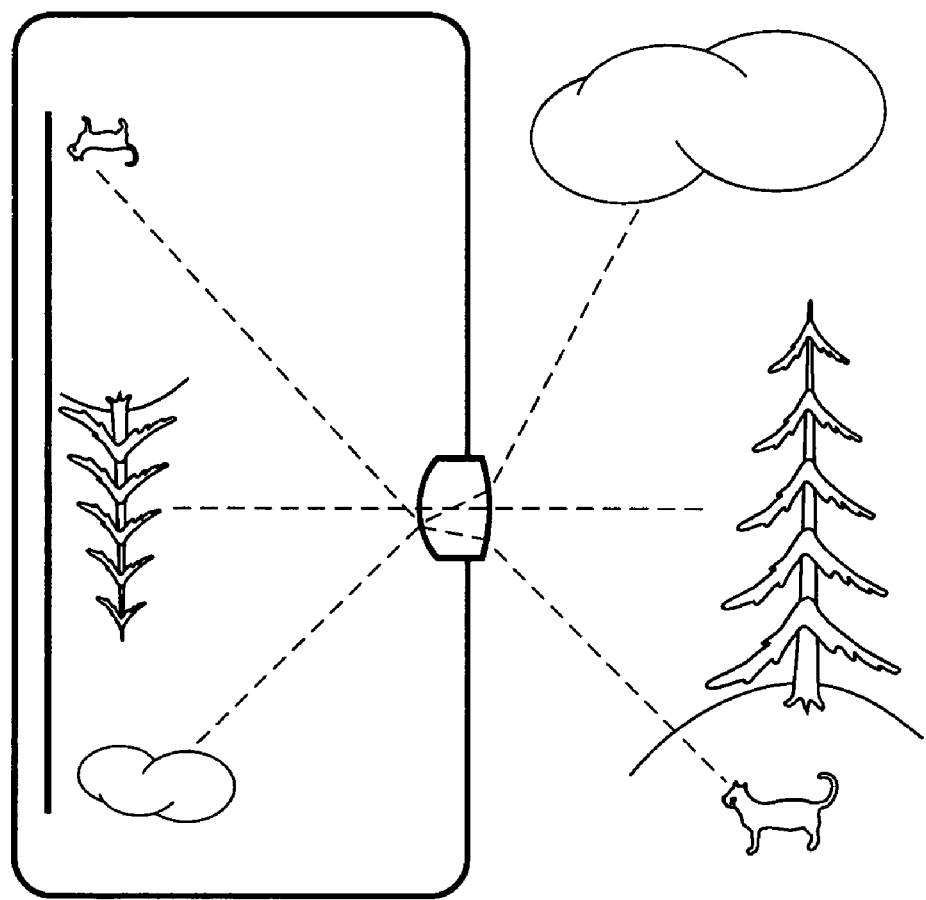
FIG. 1 depicts a generalized conventional camera with flat film or a flat sensor.
Figure 2:
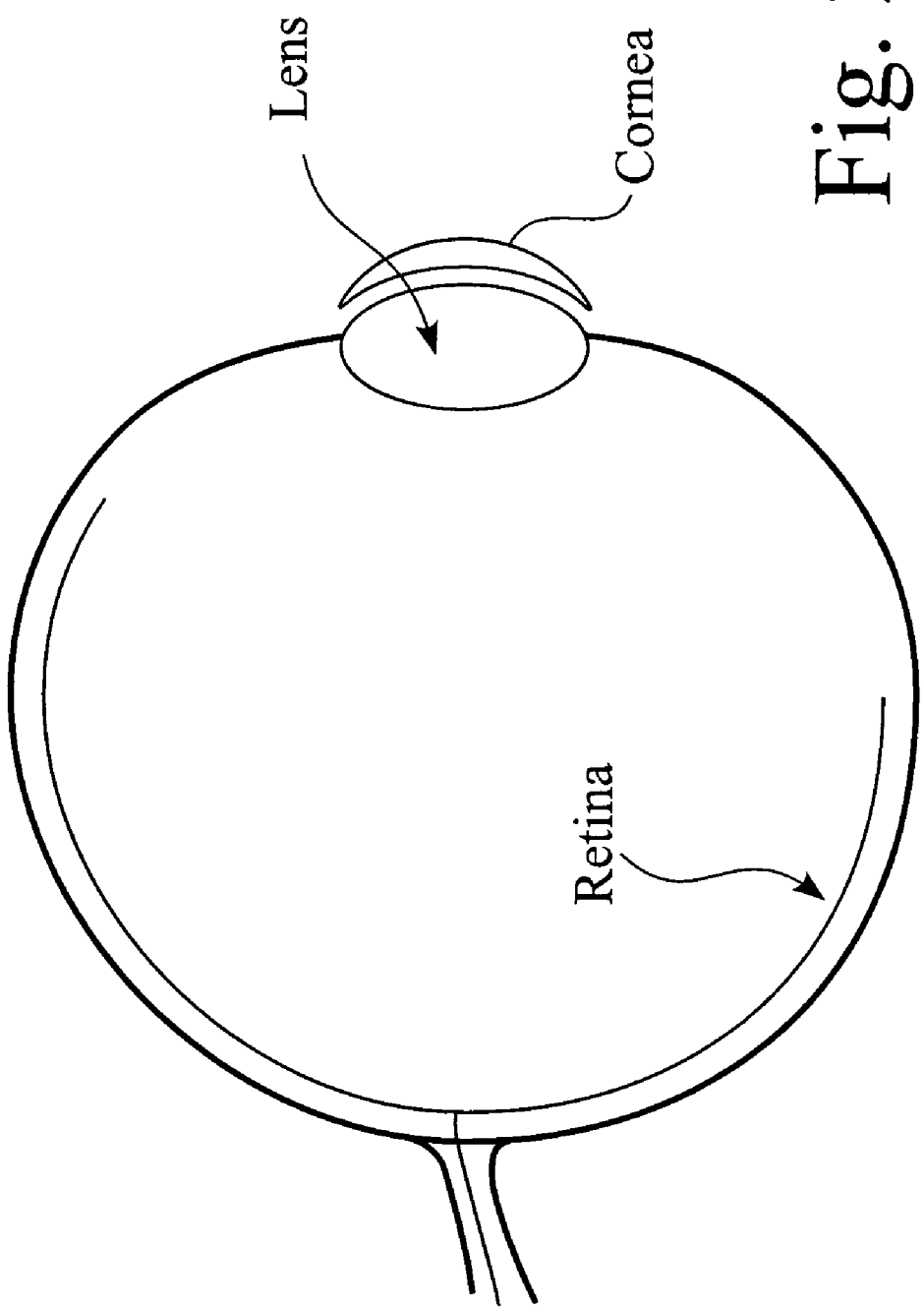
FIG. 2 is a simplified depiction of the human eye.
Figure 3:
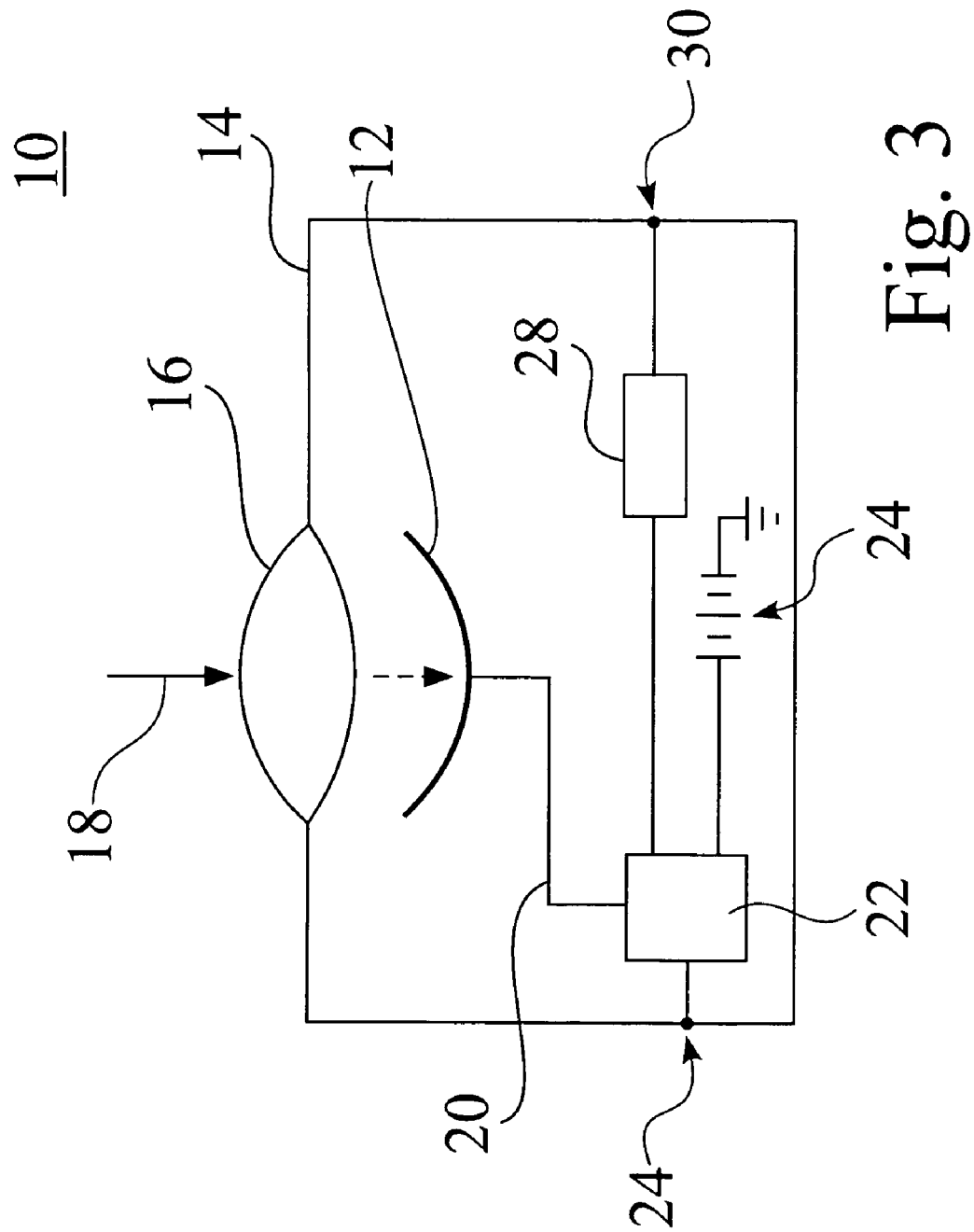

FIG. 3 provides a generalized schematic diagram of a digital camera with a curved sensor manufactured in accordance with one embodiment of the present invention.

Figure 4:
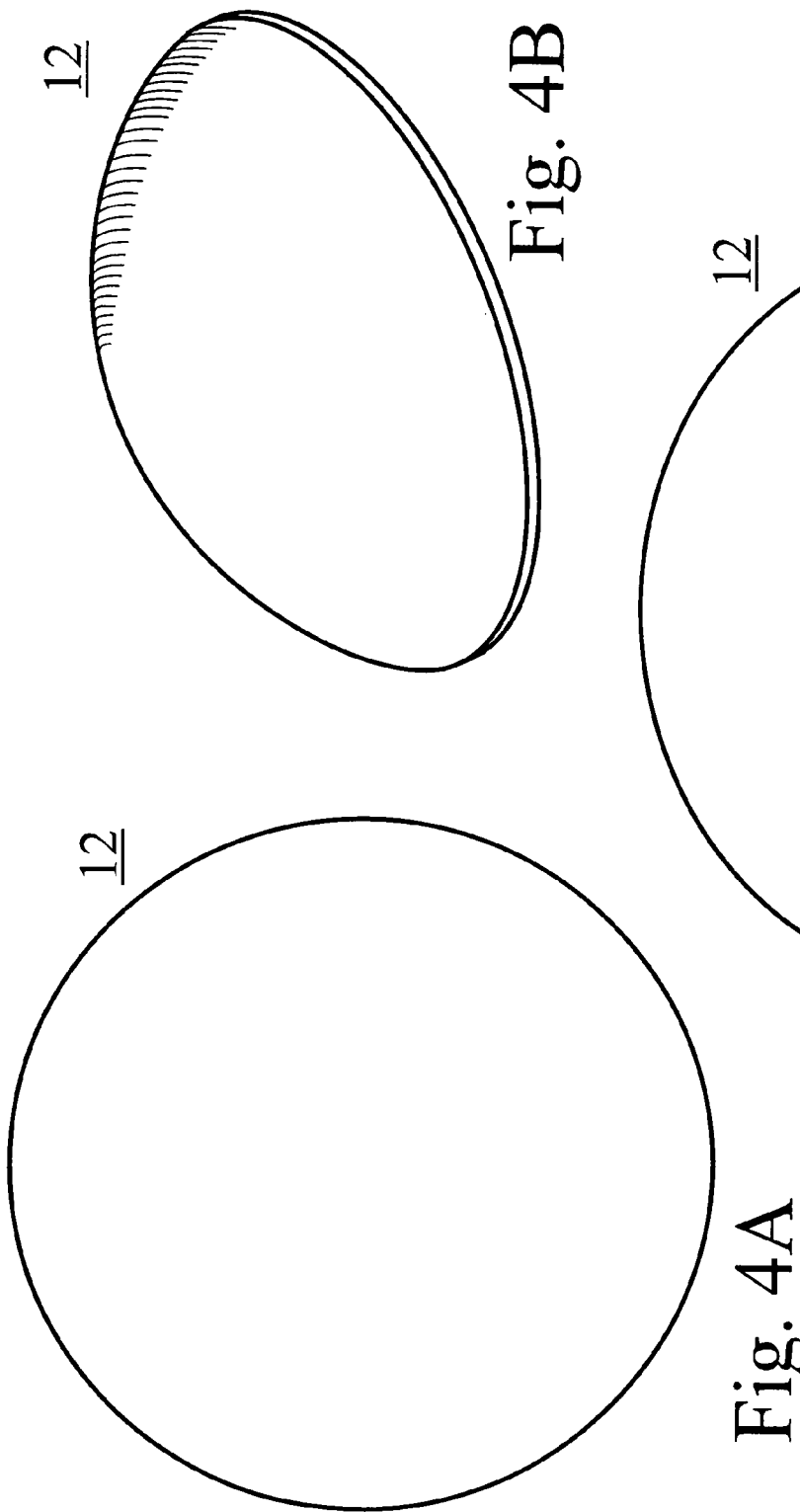

FIGS. 4A, 4B, and 4C offer an assortment of views of a generally curved sensor.

Figure 5:
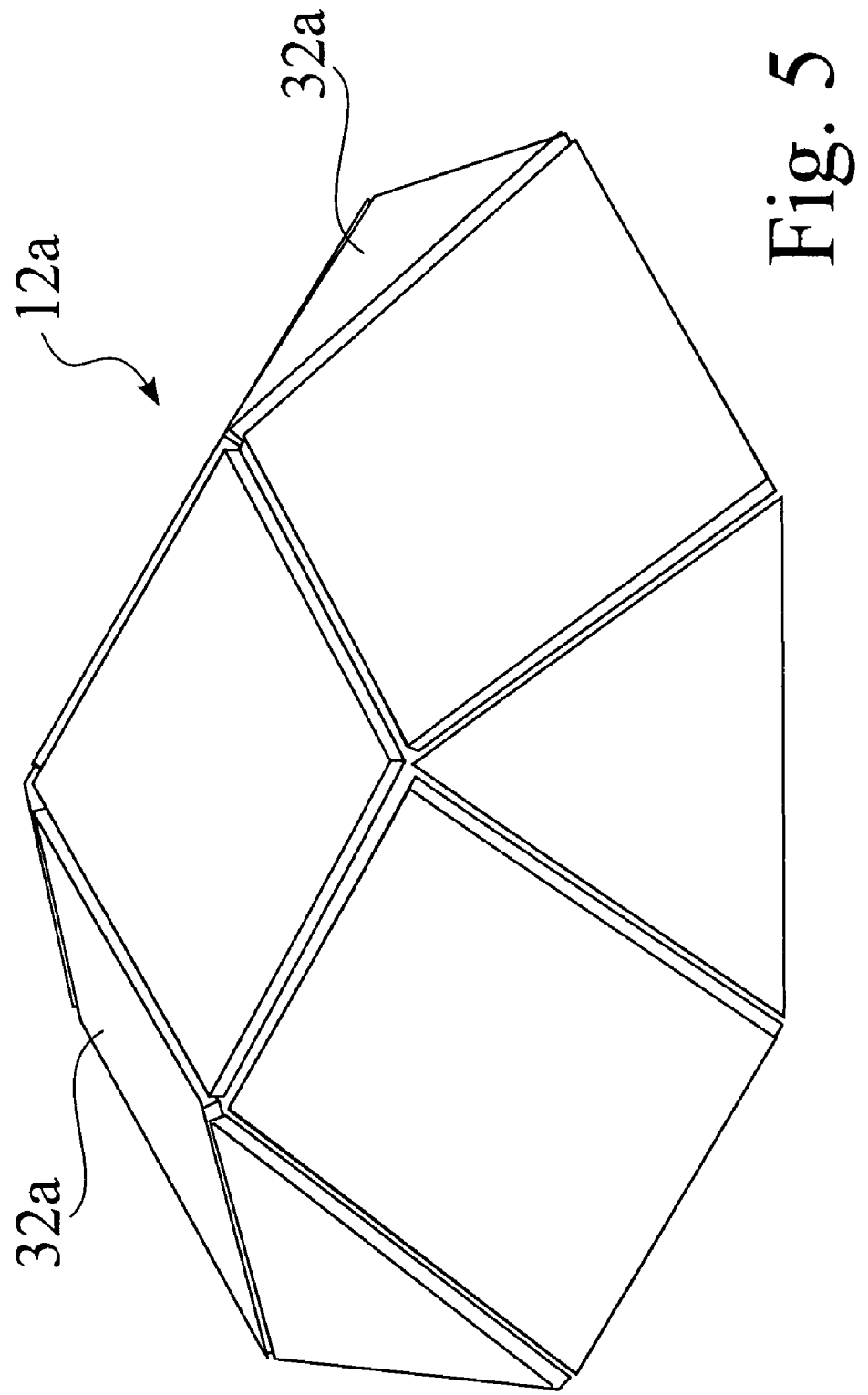

FIG. 5 depicts a sensor formed from nine planar segments or facets.

Figure 6:
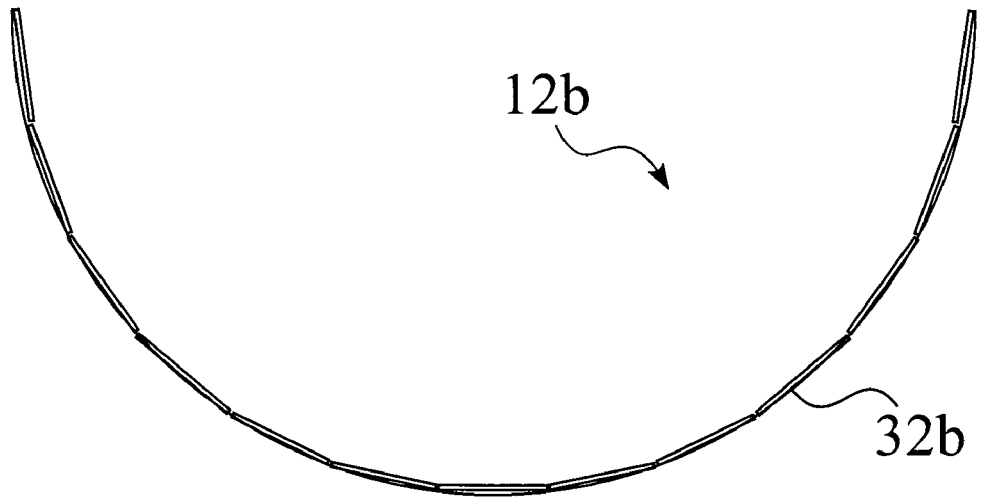

FIG. 6 reveals a cross-sectional view of a generally curved surface comprising a number of flat facets.

Figure 7:
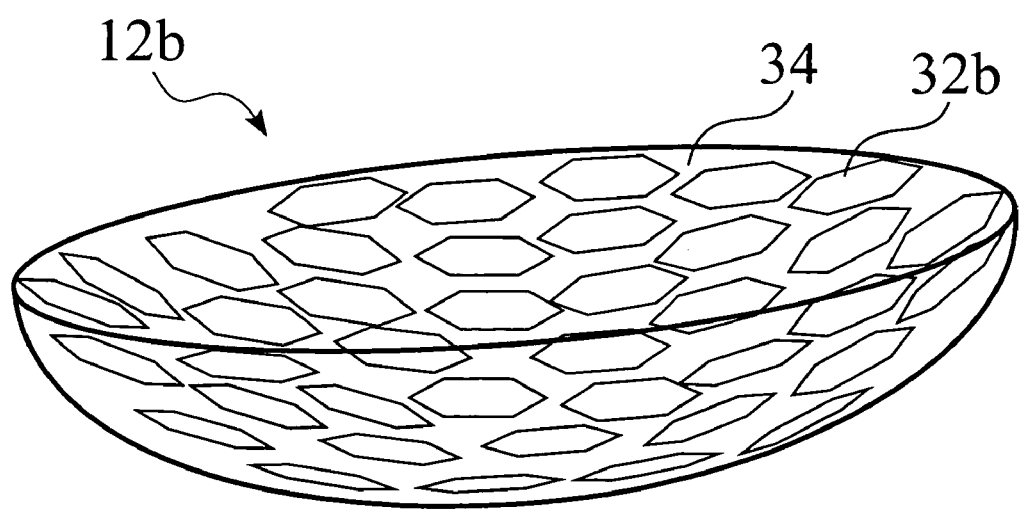

FIG. 7 provides a perspective view of the curved surface shown in FIG. 6.

Figure 8:
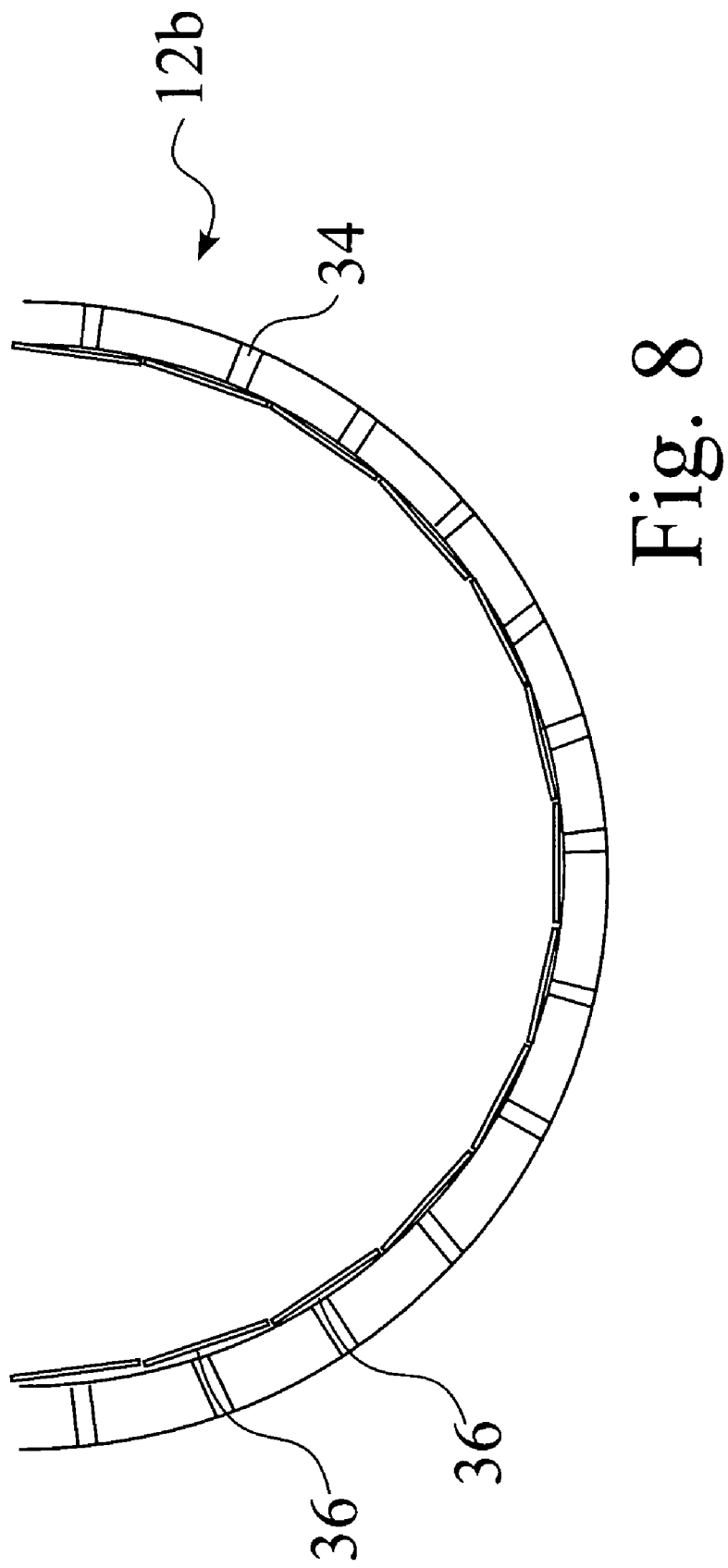

FIG. 8 offers a view of one method of making the electrical connections for the sensor shown in FIGS. 6 and 7.

Figure 9A:
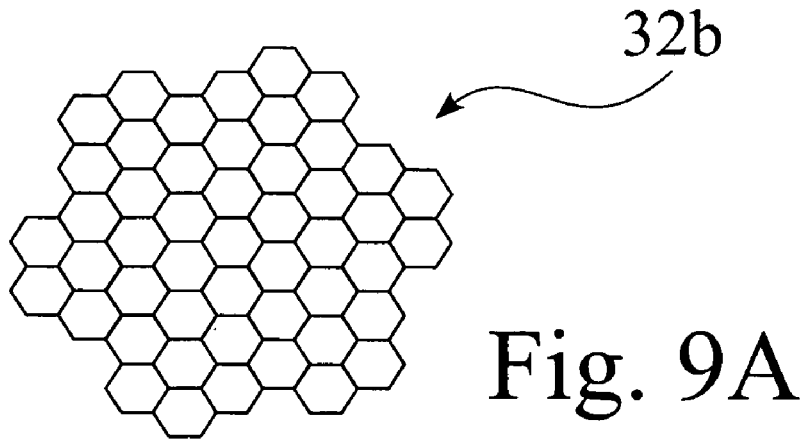
Figure 9B:
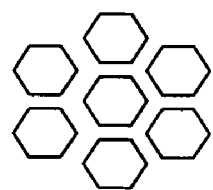

FIGS. 9A and 9B portray additional details of the sensor illustrated in FIG. 7, before and after enlarging the gaps above the substrate, the flat surface can be bent.

FIG. 10 supplies a view of sensor connections.

Figure 11A:
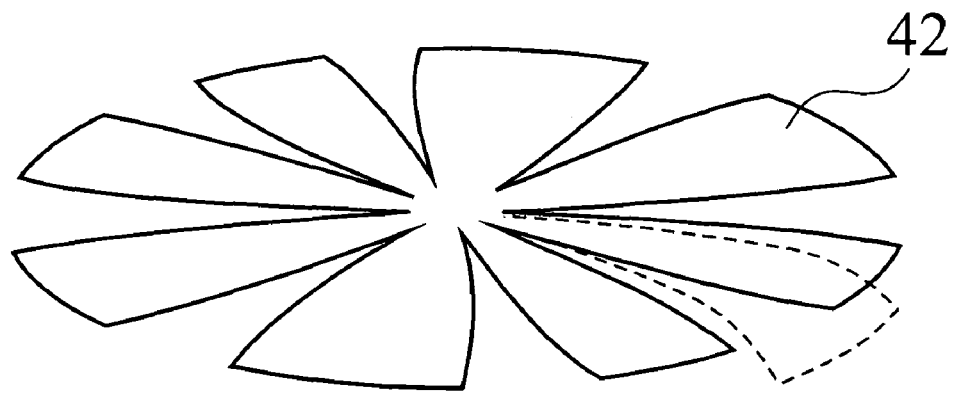
Figure 11B:
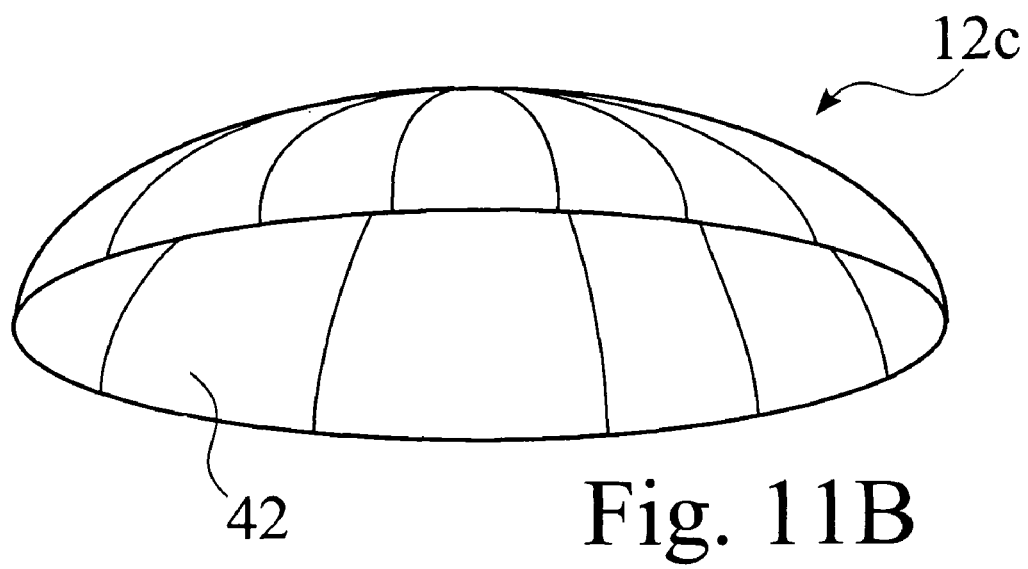

FIGS. 11A and 11B depict a series of petal-shaped segments of ultra-thin silicon that are bent or otherwise formed to create a generally dome-shaped surface.

Figure 12:
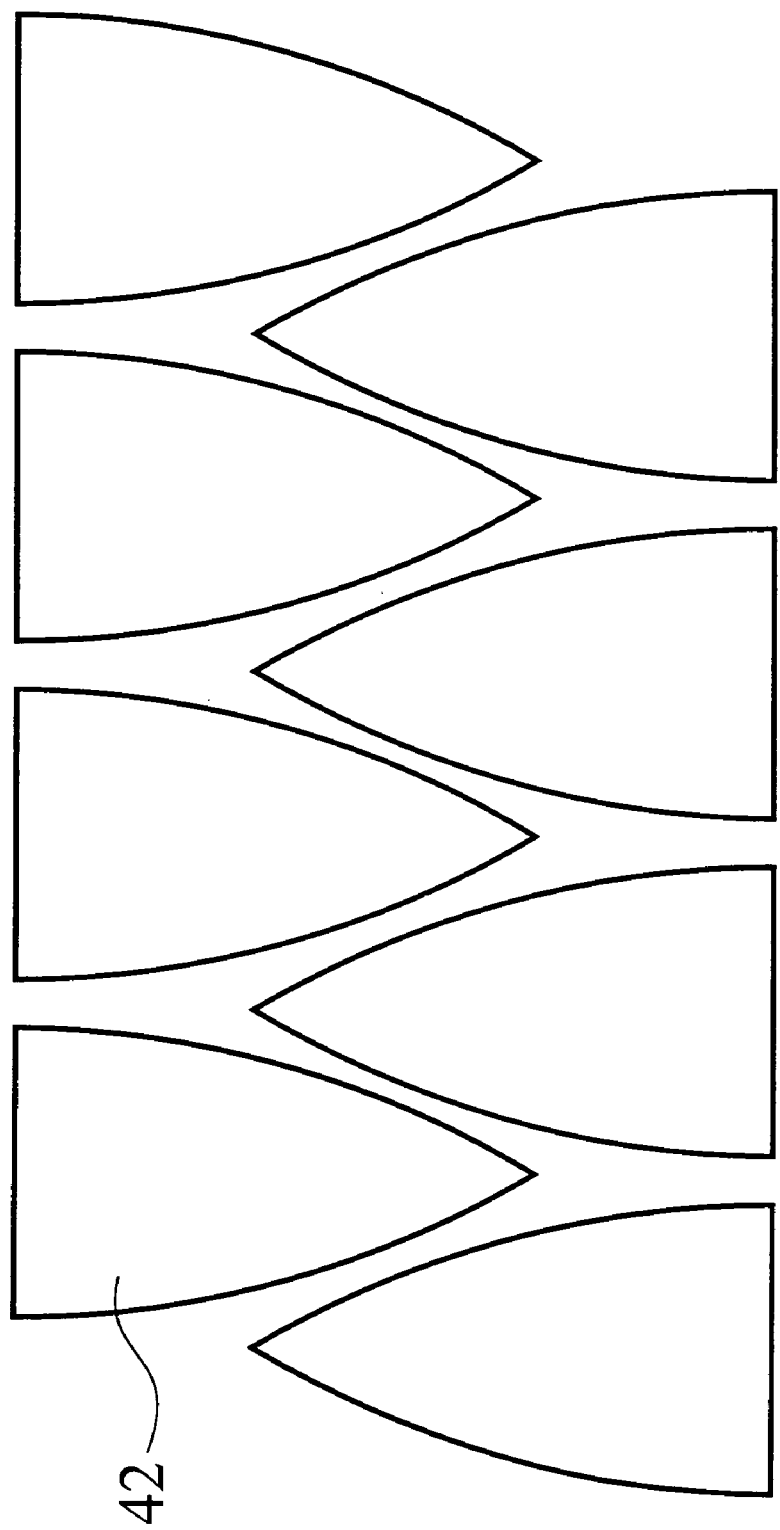

FIG. 12 furnishes a detailed view of an array of sensor segments.

Figure 13:
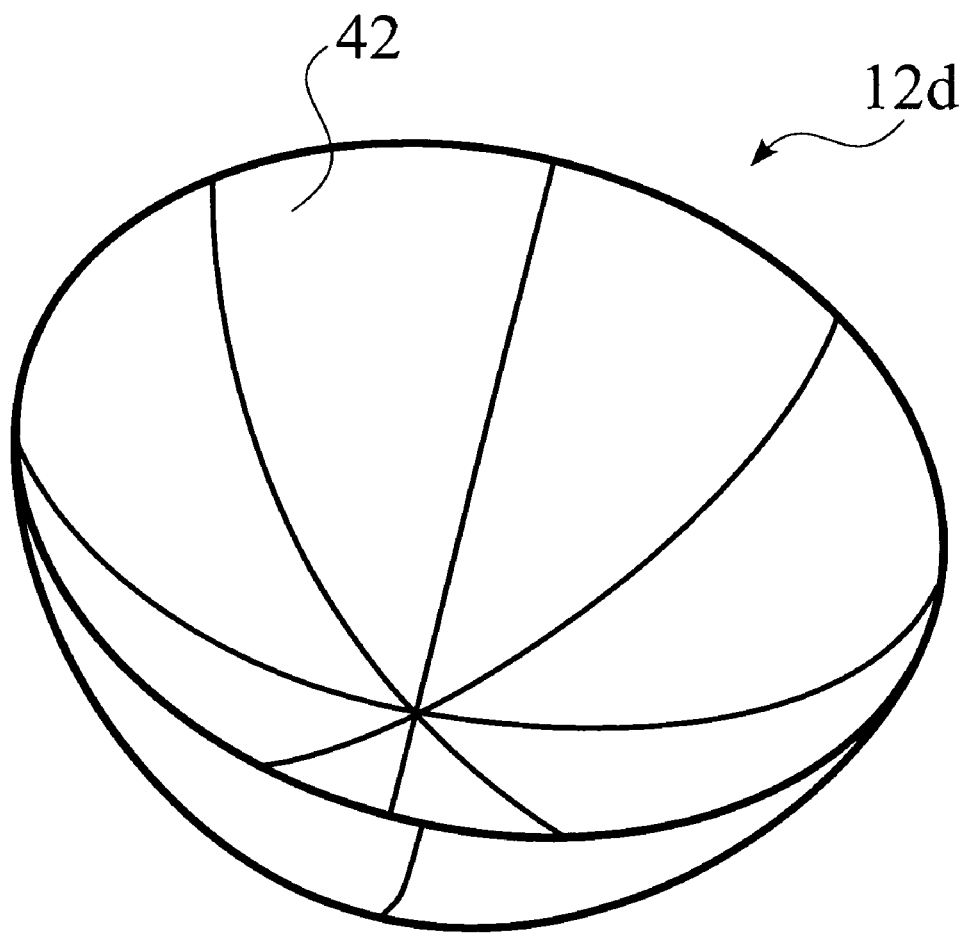

FIG. 13 is a perspective view of a curved shape that is produced when the segments shown in FIG. 12 are joined.

Figure 14:
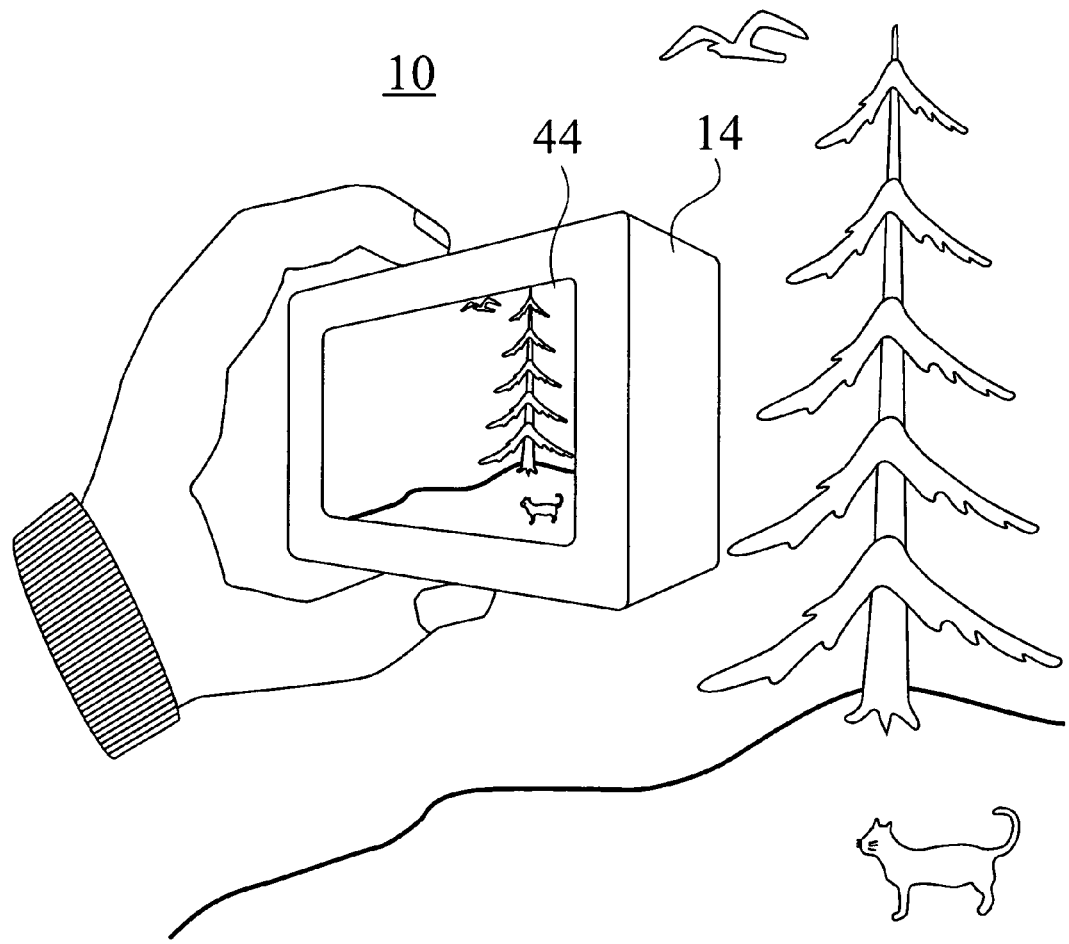

FIG. 14 shows a camera taking a wide angle photo image.

Figure 15:
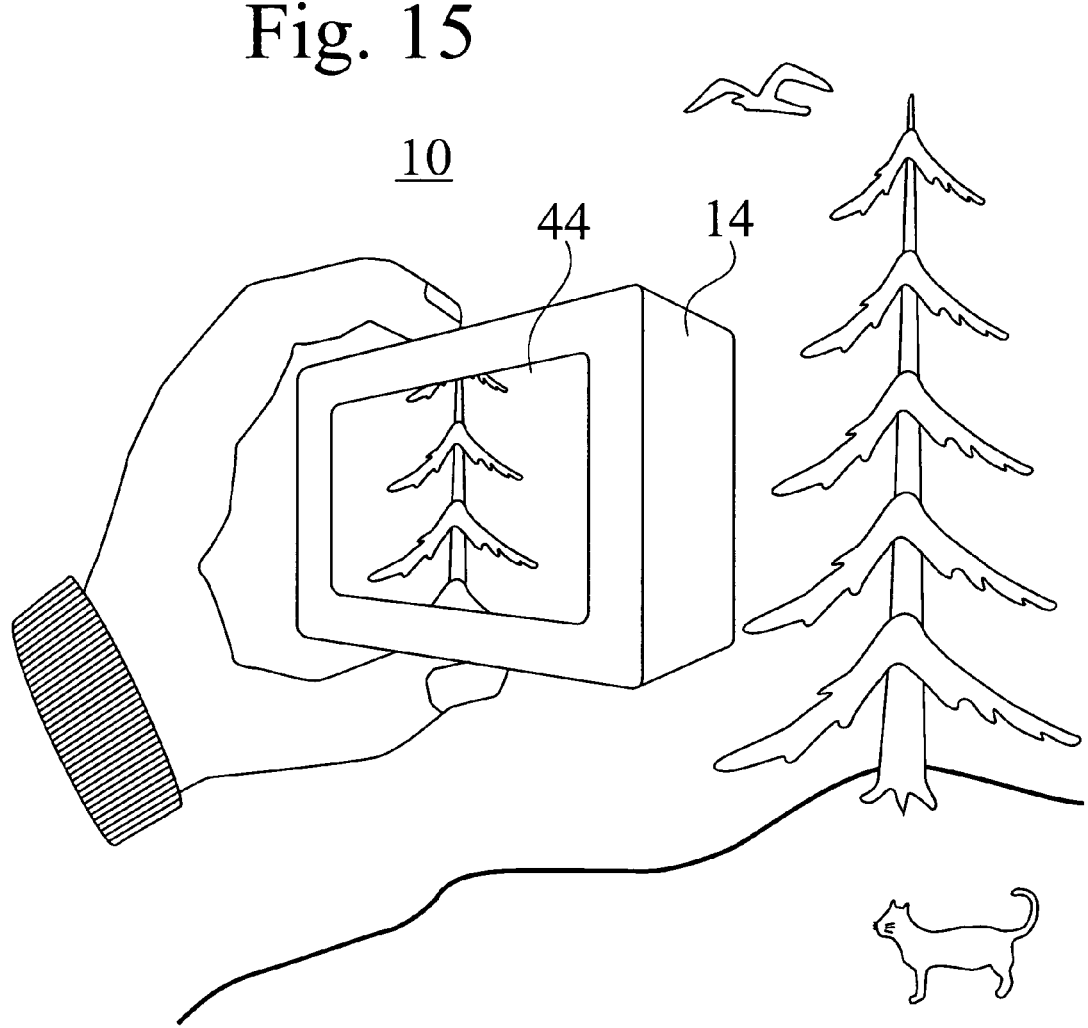

FIG. 15 shows a camera taking a normal perspective photo image.

Figure 16:
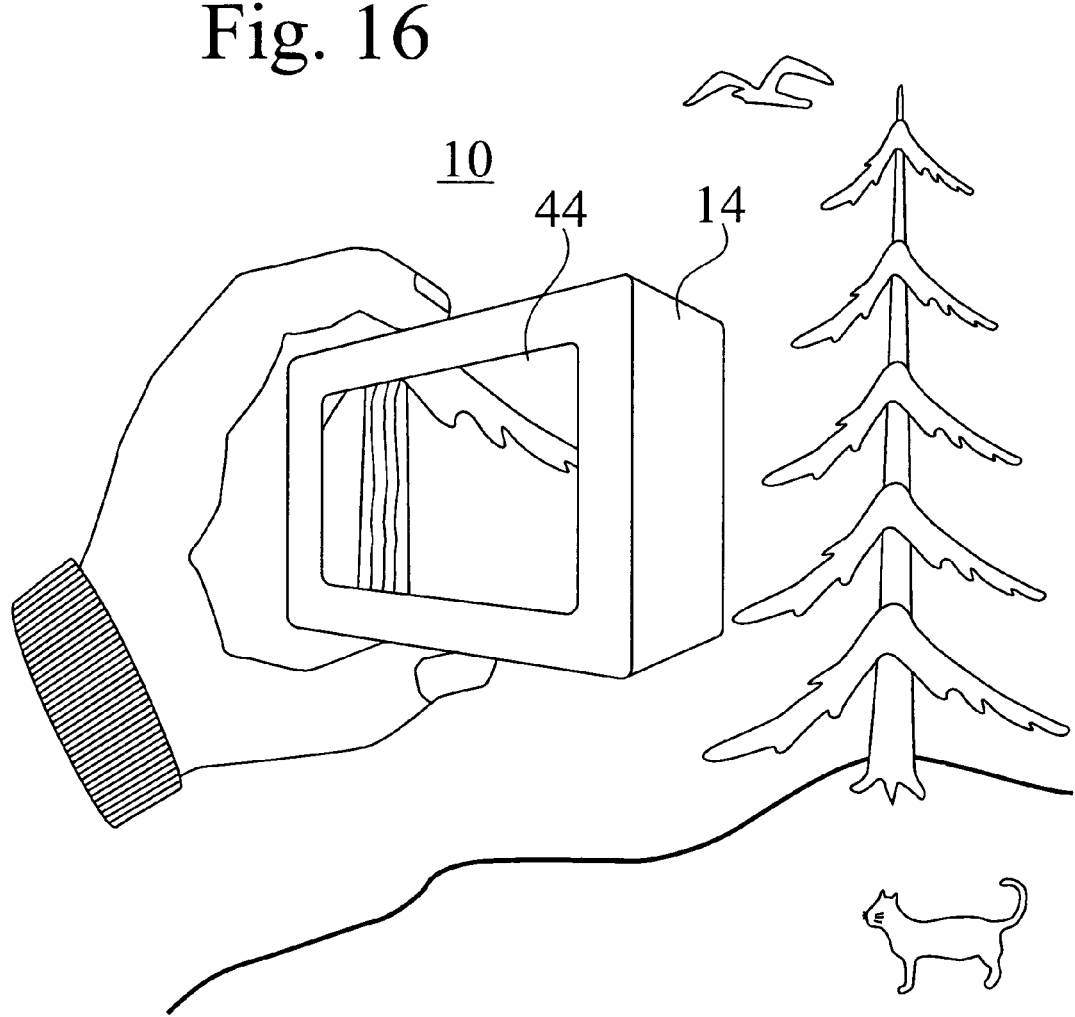

FIG. 16 shows a camera taking a telephoto image.

Figure 17A:
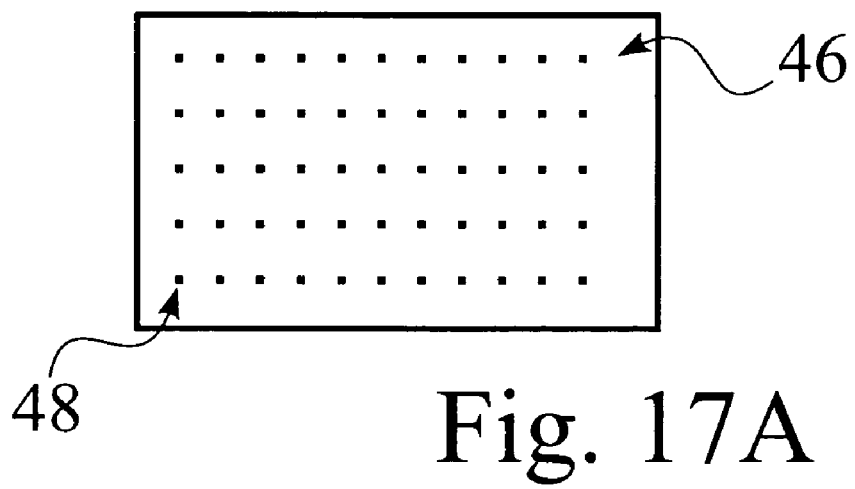
Figure 17B:
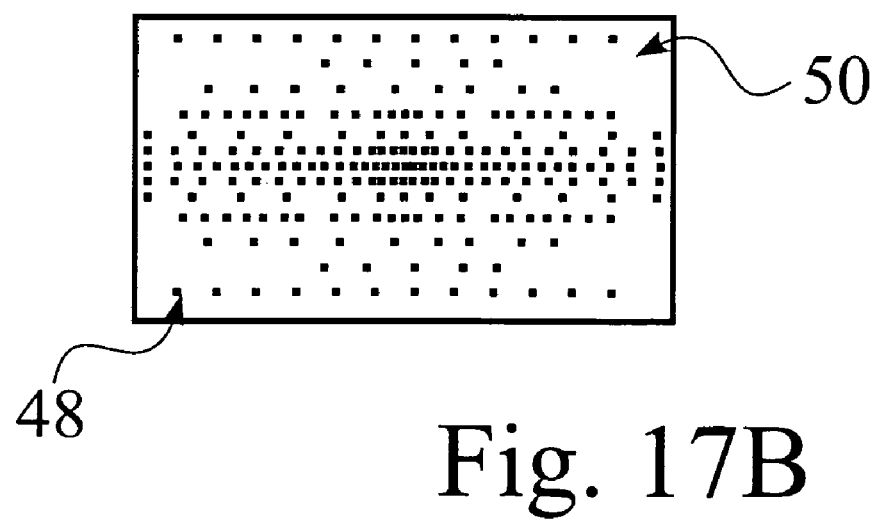

FIGS. 17A and 17B illustrate the feature of variable pixel density by comparing views of a conventional sensor with one of the embodiments of the present invention, where pixels are more concentrated in the center.

FIGS. 18A, 18B, 18C and 18D provide schematic views of a camera with a retractable and extendable shade. When the camera is used for wide angle shots, the lens shade retracts. For telephoto shots, the lens shade extends. For normal perspectives, the lens shade protrudes partially.

Figure 19:
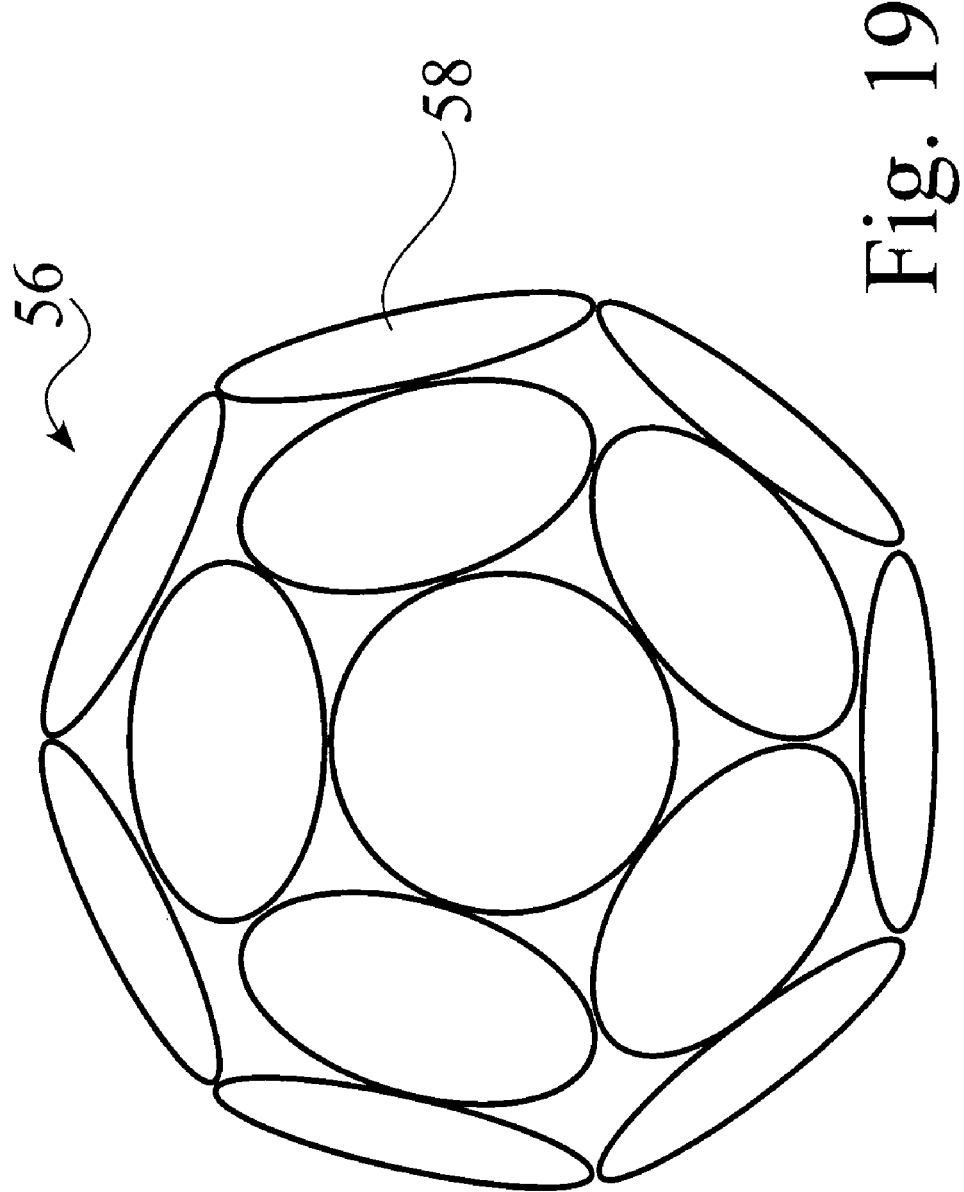

FIG. 19 provides a view of an alternative embodiment, a multi-lens camera assembly.

Figure 20:
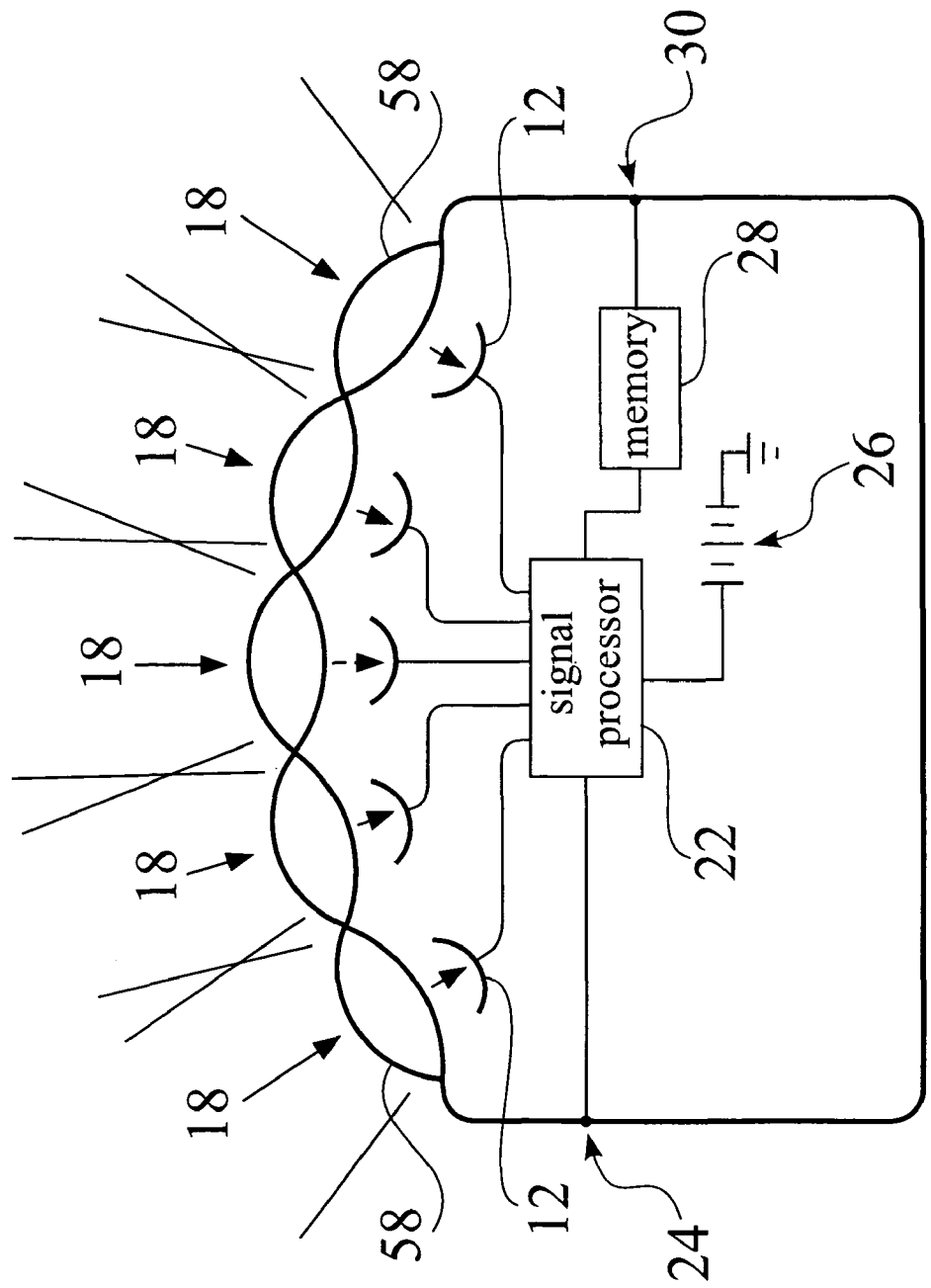
Figure 25A:
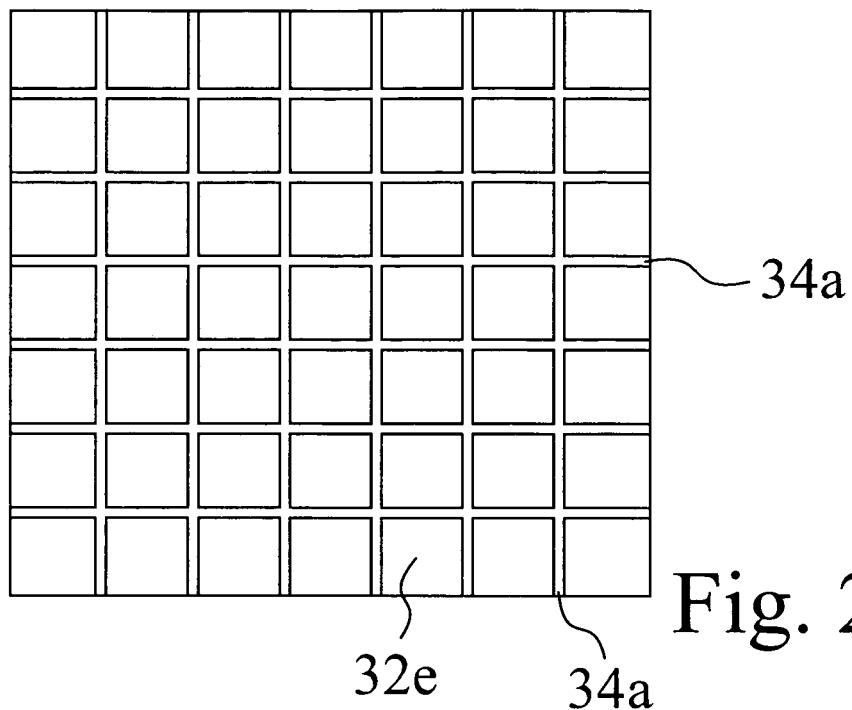
Figure 25B:
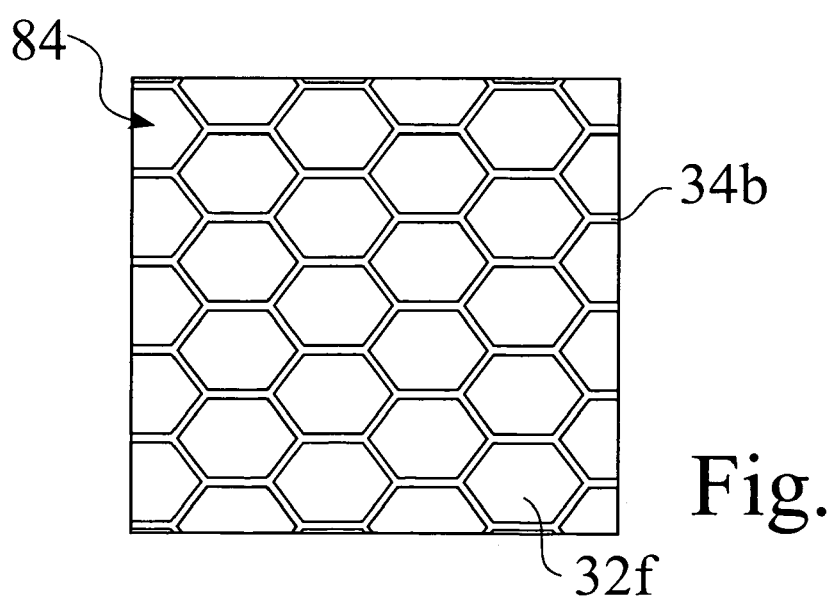
Figure 25C:
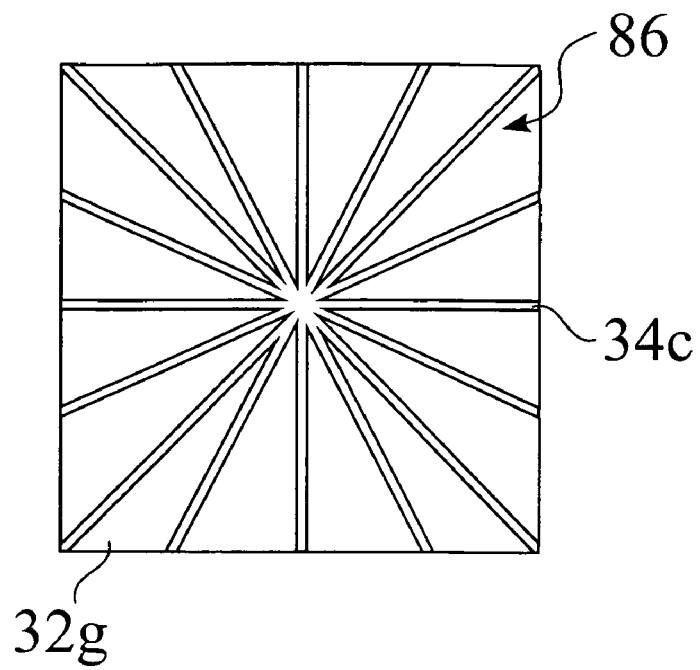
Figure 25D:
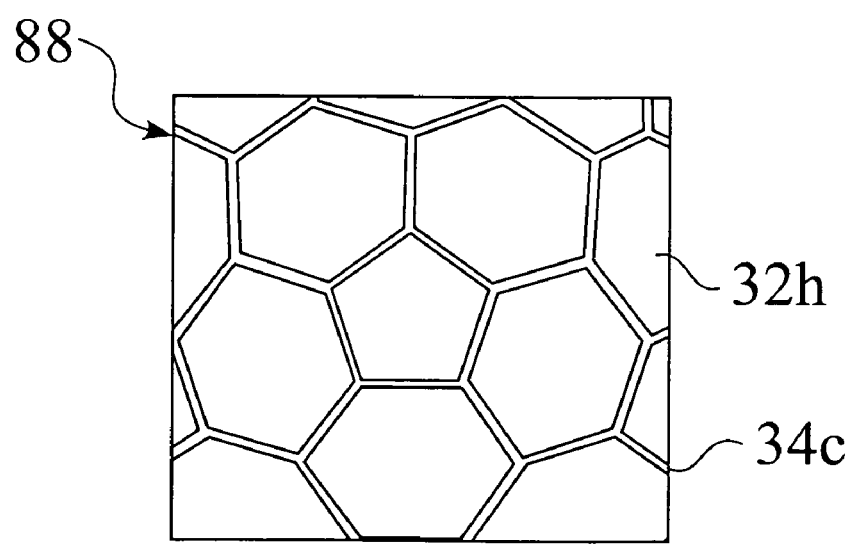

FIG. 20 is a cross-sectional schematic of a multi-lens camera assembly shown in FIG. 19.

FIG. 21 offers a view of another implementation of the present invention, a mirrored camera/lens combination.

FIG. 22 furnishes a view of another embodiment of a mirrored camera/lens combination.

FIGS. 23A and 23B supply two views of a composite sensor. In the first view, the sensor is aligned in its original position, and captures a first image. In the second view, the sensor has been rotated, and captures a second image. The two successive images are combined to produce a comprehensive final image.

FIGS. 24A and 24B offer an alternative embodiment to that shown in FIGS. 23A and 23B, in which the sensor position is displaced diagonally between exposures.

FIGS. 25A, 25B, 25C and 25D offer four views of sensors that include gaps between a variety of arrays of sensor facets.

Figure 26:
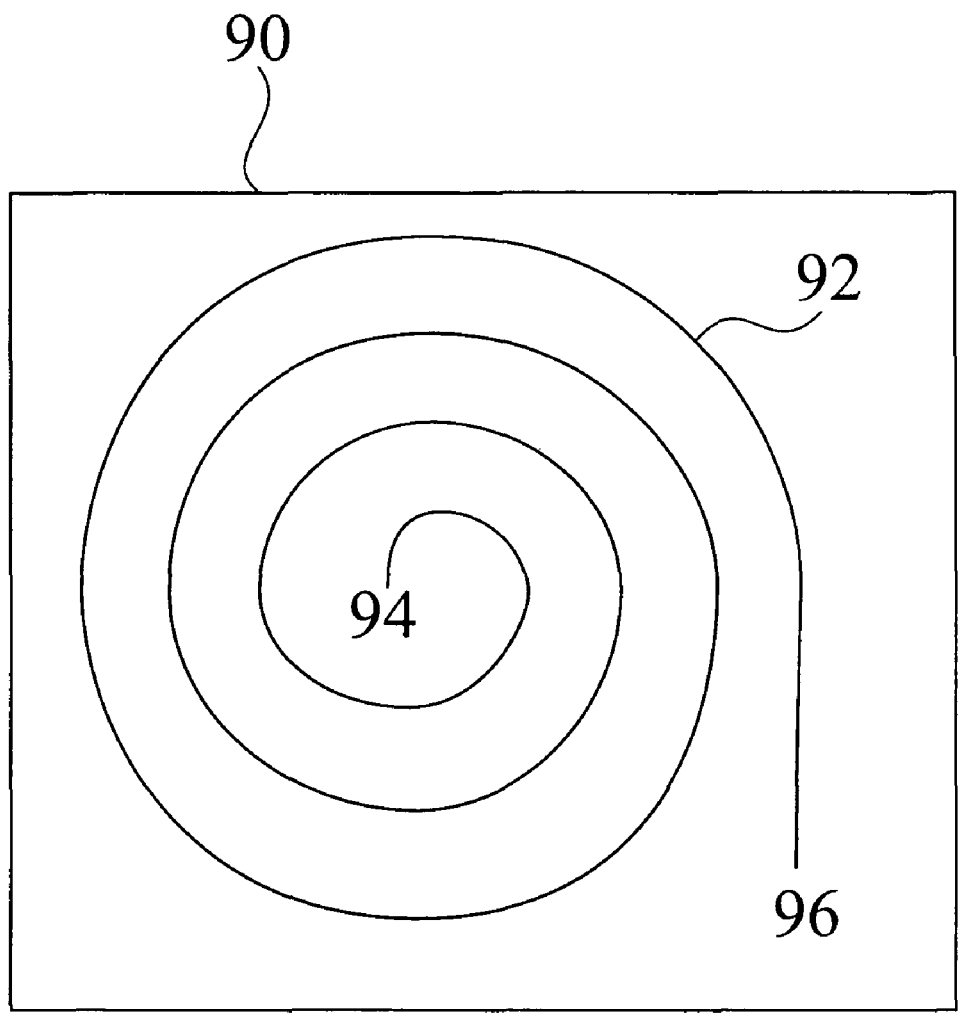
Figure 27:
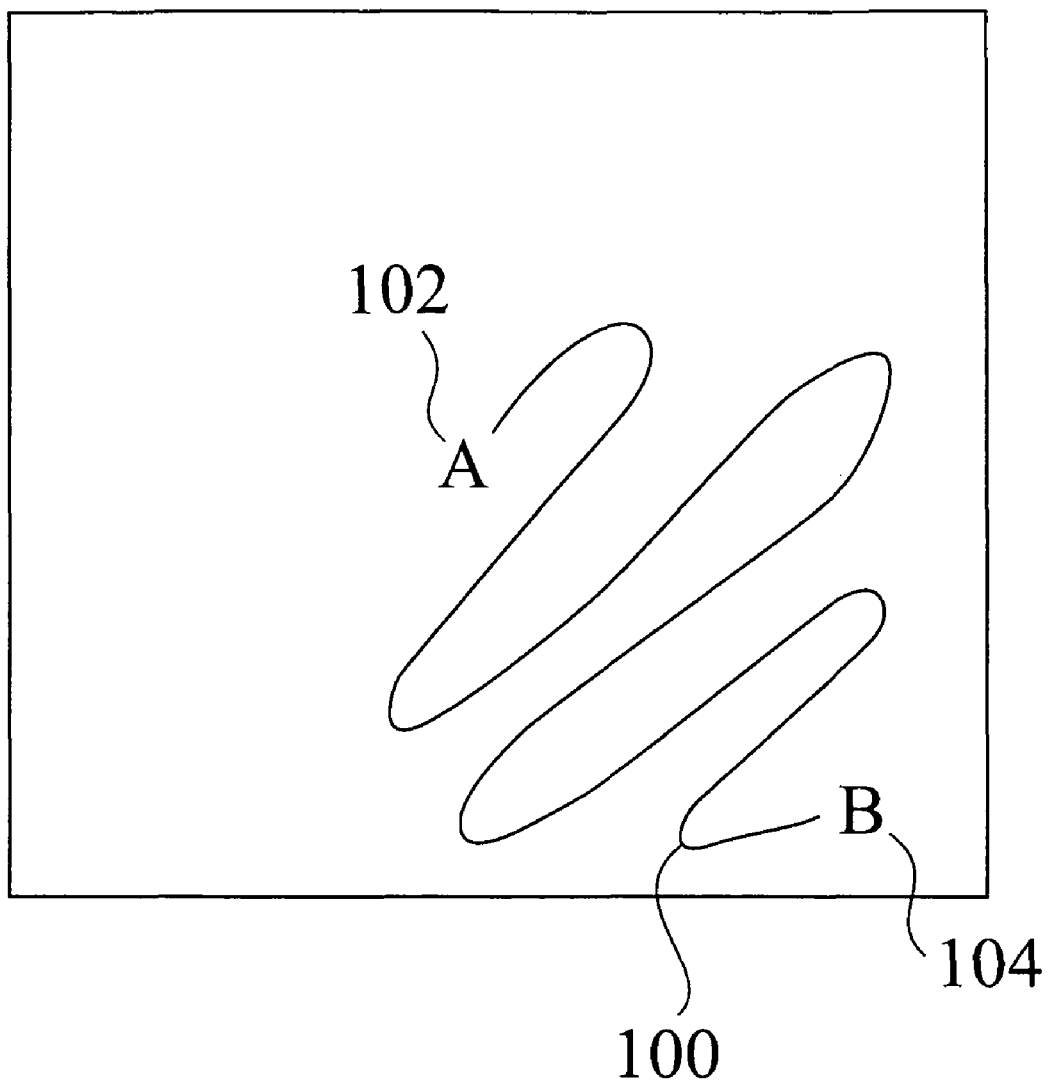
Figure 28:
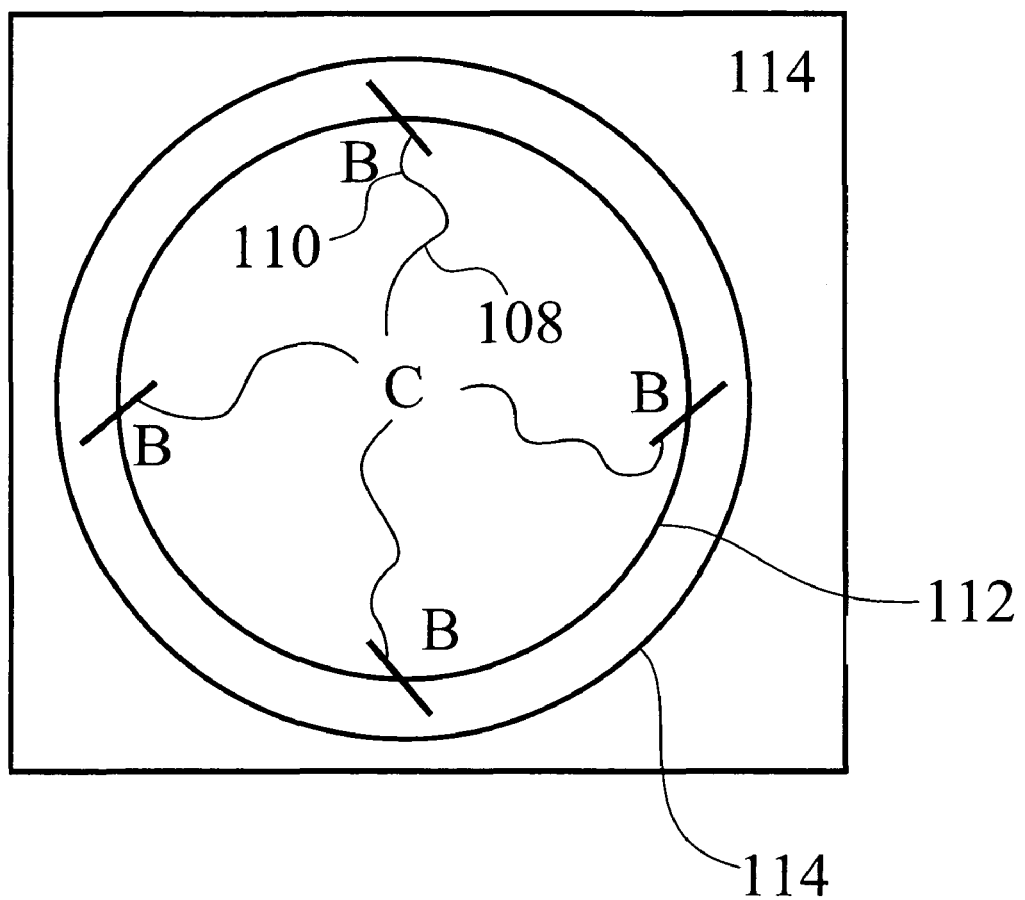

FIGS. 26, 27 and 28 provide illustrations of the back of a moving sensor, revealing a variety of connecting devices which may be used to extract an electrical signal.

Figure 29:
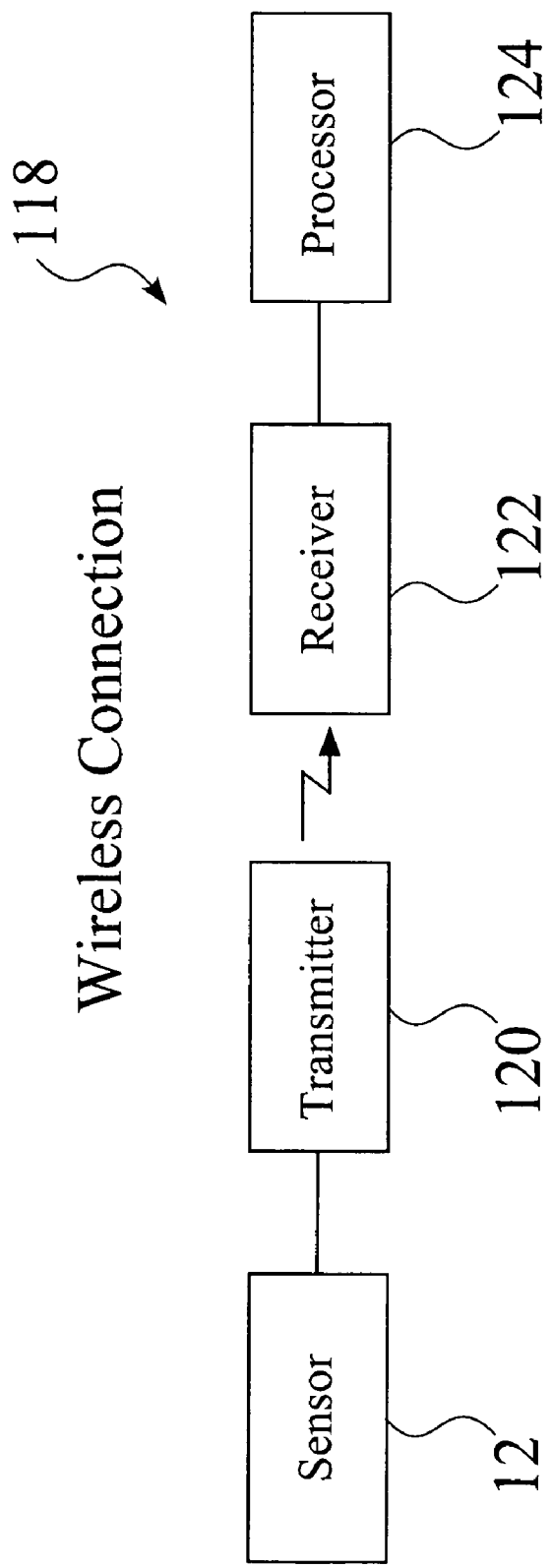

FIG. 29 is a block diagram that illustrates a wireless connection between a sensor and a processor.

A DETAILED DESCRIPTION OF PREFERRED & ALTERNATIVE EMBODIMENTS

I. A Camera with a Curved Sensor

The present invention comprises methods and apparatus for a Curvilinear Sensor System. The present invention includes a wide variety of generally curved, aspheric or non-planar sensors and their equivalents. The curvilinear surfaces, edges or boundaries that define the geometry of the present invention may be continuous, or may be aggregations of many small planar or other segments which approximate a curved surface. In general, the sensor which is described and claimed in the Present Patent Application occupies three dimensions of space, as opposed to conventional sensors, which are planes that are substantially and generally contained in two physical dimensions. The present invention includes sensors which are configured in a variety of three-dimensional shapes, including, but not limited to, spherical, paraboloidal and ellipsoidal surfaces. In addition, the present invention also includes sensors which comprise segments or facets that approximate a curved surface.

In this Specification and in the Claims that follow, the terms "curvilinear" and "curved" encompasses any line, edge, boundary, segment, surface or feature that is not completely colinear with a straight line. In this Specification and in the Claims that follow, the term "sensor" encompasses any detector, imaging device, measurement device, transducer, focal plane array, charge-coupled device (CCD), complementary metal-oxide semiconductor (CMOS) or photocell that responds to an incident photon of any wavelength.

While one embodiment of the present invention is designed to record images in the optical spectrum, other embodiments of the present invention may be used for a variety of tasks which pertain to gathering, sensing and/or recording other forms of radiation. The present invention includes systems that gather and/or record color, black and white, infra-red, ultraviolet, x-rays or any other form of radiation, emanation, wave or particle. The present invention also includes systems that record still images or partial or full-motion moving pictures.

FIG. 3 provides a generalized schematic diagram of a digital camera 10 with a curved sensor 12. A housing 14 has an objective lens 16 mounted on one of its walls. The objective lens 16 receives incoming light 18. In general, the sensor 12 converts the energy of the incoming photons 18 to an electrical output 20, which is then fed to a signal or photon processor 22. The signal processor 22 is connected to user controls 24, a battery or power supply 26 and to a solid state memory 28. Images created by the signal processor 22 are stored in the memory 28. Images may be extracted or downloaded from the camera through an output terminal 30, such as a USB port.

II. Alternative Sensor Geometries

The present invention includes, but is not limited to, the following embodiments of sensors and/or their equivalents:

1. Curved sensors: Generally continuous portions of spheres, or revolutions of conic sections such as parabolas or ellipses or other non-planar shapes. Examples of a generally curved sensor 12 appear in FIGS. 4A, 4B and 4C. In this Specification, and in the Claims that follow, various embodiments of curved sensors are identified with reference character 12, 12a, 12b, 12c, and so on.

2. Faceted sensors: Aggregations of polygonal facets or segments. Any suitable polygon may be used to implement the present invention, including triangles, trapezoids, pentagons, hexagons, septagons, octagons or others. FIG. 5 exhibits a sensor 12a comprising nine flat polygonal segments or facets 32a. For some applications, a simplified assembly of a few flat sensors might yield most of the benefit of a smooth curve, while achieving a much lower assembly cost. FIGS. 6 and 7 provide side and perspective views of a generally spherical sensor surface 12b comprising a number of flat facets 32b. FIG. 7 shows exaggerated gaps 34 between the facets. The facets could each have hundreds, thousands or many millions of pixels. In this Specification, and in the Claims that follow, the facets of the sensor 12 are identified with reference characters 32, 32a, 32b, 32c and so on.

FIG. 8 offers a view of the electrical connections 36 for the curved sensor 12b shown in FIG. 7. The semiconductor facet array is disposed on the interior surface. The exterior surface may be a MYLAR™, KAPTON™ or similar wiring backplane formed in a curved shape. Vias provide electrical connections between the facet array and the wiring backplane. In one embodiment, two to two thousand or more electrical pathways may connect the facet array and the wiring backplane.

FIG. 9 provides a detailed view of facets on the curved sensor 12b. In general, the more polygons that are employed to mimic a generally spherical surface, the more the sensor will resemble a smooth curve. In one embodiment of the invention, a wafer is manufactured so that each camera sensor has tessellated facets. Either the front side or the back side of the wafer of sensor chips is attached to a flexible membrane that may bend slightly (such as MYLAR™ or KAPTON™), but which is sufficiently rigid to maintain the individual facets in their respective locations. A thin line is etched into the silicon chip between each facet, but not through the flexible membrane. The wafer is then shaped into a generally spherical surface. Each facet is manufactured with vias formed through the wafer to connect a backside wiring harness. This harness may also provide mechanical support for the individual facets.

FIGS. 9A and 9B furnish a view of the facets 32b which reside on the interior of the curved sensor, and the electrical interconnects that link the sensor facets with the wiring backplane.

FIG. 10 illustrates a wiring backplane 38 which may be used to draw output signals from the facets on the sensor.

FIGS. 11A and 11B show a generally hemispherical shape 40 that has been formed by bending and then joining a number of ultra-thin silicon petal-shaped segments 42. These segments are bent slightly, and then joined to form the curved sensor.

FIG. 12 provides a view of one embodiment of the petal-shaped segments 42. Conventional manufacturing methods may be employed to produce these segments. In one embodiment, these segments are formed from ultra-thin silicon, which are able to bend somewhat without breaking. In another embodiment, pixel density is increased at the points of the segments, and are gradually decreased toward the base of each segment. This embodiment may be implemented by programming changes to the software that creates the pixels.

FIG. 13 offers a perspective view of one embodiment of a curved shape that is formed when the segments shown in FIG. 12 are joined. The sensors are placed on the concave side, while the electrical connections are made on the convex side. The number of petals used to form this non-planar surface may comprise any suitable number. Heat or radiation may be employed to form the silicon into a desired shape. The curvature of the petals may be varied to suit any particular sensor design.

In one alternative embodiment, a flat center sensor might be surrounded by these "petals" with squared-off points.

II. Advantages & Alternative Embodiments

Digital Zoom

FIG. 14 shows a camera taking a wide angle photo. FIG. 15 shows the same camera taking a normal perspective photo, while FIG. 16 shows a telephoto view. In each view, the scene stays the same. The view screen on the camera shows a panorama in FIG. 14, a normal view in FIG. 15, and detail from the distance in FIG. 16. Just as with optical zoom, digital zoom shows the operator exactly the scene that is being captured by the camera sensor.

Digital zoom is software-driven. The camera either captures only a small portion of the central image, the entire scene or any perspective in between. The monitor shows the operator what portion of the overall image is being recorded. When digitally zooming out to telephoto in one embodiment of the present invention, which uses denser pixels in its center, the software can use all the data. Since the center has more pixels per area, the telephoto image, even though it is cropped down to a small section of the sensor, produces a crisp image. This is because the pixels are more dense at the center.

When the camera has "zoomed back" into a wide angle perspective, the software can compress the data in the center to approximate the density of the pixels in the edges of the image. Because so many more pixels are involved in the center of this wide angle scene, this doesn't effect wide angle image quality. Yet, if uncompressed, the center pixels represent unnecessary and invisible detail captured, and require more storage capacity and processing time. Current photographic language might call the center section as being processed "RAW" or uncompressed when shooting telephoto but being processed as "JPEG" or other compression algorithm in the center when the image is wide angle.

The present invention will provide lighter, faster, cheaper and more dependable cameras. In one embodiment, the present invention will provide digital zoom. Since the present invention will not require optical zoom, they will use inherently lighter lens designs with fewer elements and will have no swinging mirrors or lens mounting brackets.

In one embodiment of the invention, more pixels are concentrated in the center of the sensor, and fewer are placed at the edges of the sensor. Various densities may be arranged in between the center and the edges. This embodiment allows the user to zoom into a telephoto shot using the center section only, and still have high resolution.

When viewing the photograph in the wide field of view, the center pixels are "binned" or summed together to normalize the resolution to the value of the outer pixel density.

When viewing the photograph in telephoto mode, the center pixels are utilized in their highest resolution, showing maximum detail without requiring any adjustment of lens or camera settings.

The present invention offers extra wide angle to extreme telephoto zoom. This feature is enabled due to the extra resolving power, contrast, speed and color resolution lenses will be able to deliver when the digital sensor is not flat, but curved, somewhat like the retina of a human eye. The average human eye, with a cornea and single lens element, uses, on average, 25 million rods and 6 million cones to capture images. This is more image data than is captured by all but a rare and expensive model or two of the cameras that are commercially available today, and those cameras typically must use seven to twenty element lenses, since they are constrained by flat sensors. These cameras cannot capture twilight images without artificial lighting. These high-end cameras currently use sensors with up to 43 mm diagonal areas, while the average human eyeball has a diameter of 25 mm. Eagle eyes, which are far smaller, have eight times the sensors as a human eye, again showing the optical potential that a curved sensor or retina yields. The present invention is more dependable, cheaper and higher performance. Interchangeable lenses are no longer necessary, which eliminates the need for moving mirrors and connecting mechanisms. Further savings are realized due to simpler lens designs, with fewer elements, because flat film and sensors, unlike curved surfaces, are at varying distances and angles from the light coming from the lens. This causes chromatic aberrations and varying intensity across the sensor. To compensate for that, current lenses, over the last two centuries, have mitigated the problem almost entirely, but, with huge compromises. Those compromises include limits on speed, resolving power, contrast, and color resolution. Also, the conventional lens designs require multiple elements, some aspheric lenses, exotic materials and special coatings for each surface. And, there are more air to glass surfaces and more glass to air surfaces, each causing loss of light and reflections.

Variable Density of Pixels

In one embodiment of the present invention, the center of the sensor, where the digitally zoomed telephoto images are captured, is configured with dense pixilation, which enables higher quality digitally zoomed images.

FIGS. 17A and 17B illustrate this feature of the invention, which utilizes a high density concentration of pixels 48 at the center of a sensor. By concentrating pixels near the central region of the sensor, digital zoom becomes possible without loss of image detail. This unique approach provides benefits for flat or curved sensors. In FIG. 17A, a conventional sensor 46 is shown, which has pixels 48 that are generally uniformly disposed over the surface of the sensor 46. FIG. 17B also offers a depiction of a sensor 48 produced in accordance with the present invention, which has pixels 48 that are more densely arranged toward the center of the sensor 50.

In another embodiment of the invention, suitable software will compress the dense data coming from the center of the image when the camera senses that a wide angle picture is being taken. This feature greatly reduces the processing and storage requirements for the system.

Lens Shade

Another embodiment of the invention includes a lens shade, which senses the image being captured, whether wide angle or telephoto. When the camera senses a wide angle image, it retracts the shade, so that the shade does not get into the image area. When it senses the image is telephoto, it extends, blocking extraneous light from the non-image areas, which can cause flare and fogged images.

Figure 18A:
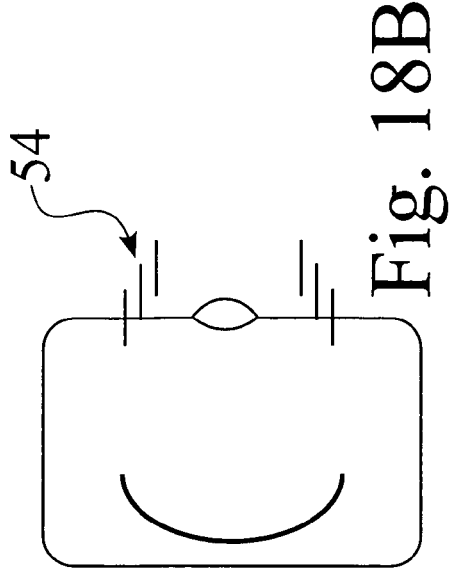
Figure 18B:
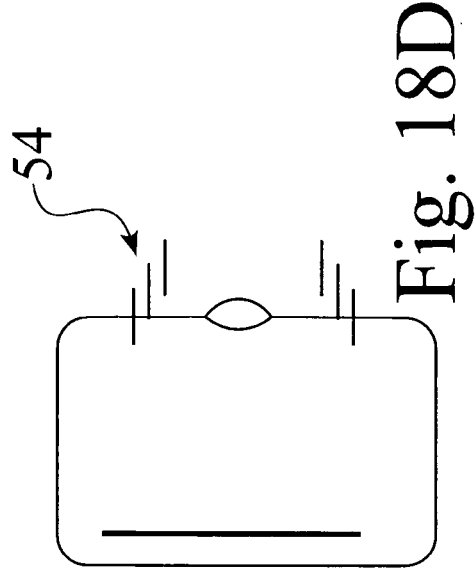
Figure 18C:
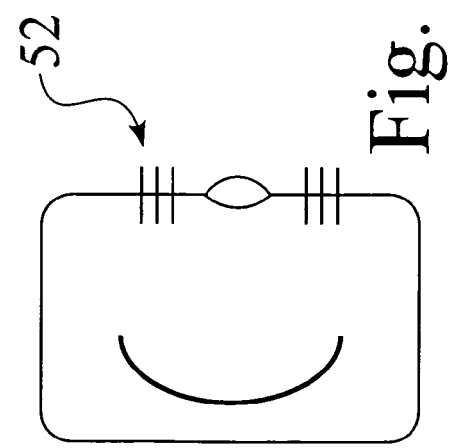
Figure 18D:
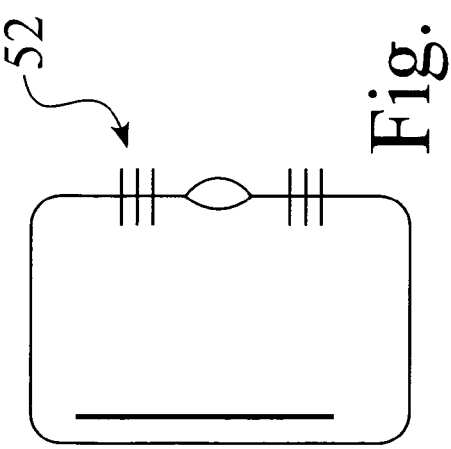

FIGS. 18A and 18B provide views of cameras equipped with an optional retractable lens shade. For wide angle shots, the lens shade is retracted, as indicated by reference character 52. For telephoto shots, the lens shade is extended, as indicated by reference character 54.

A Multi-Lens Camera Assembly

FIG. 19 reveals a cross-section of a multi-lens camera 56. FIG. 20 is a cross-sectional view which shows incoming light 18 as it passes through a number of objective lenses 58 generally disposed on one side of the camera's enclosure 14. A curved sensor 12 behind each lens generates a signal. All the signals are fed to a one or more processors 22, which stitch images together without seams. The processor 22 is regulated by user controls 24, and is powered by a battery 26. The images are fed to a memory 28, which is connected to an output port 30. In one embodiment, the sensors are slightly curved. The pixel density of the sensors may be varied so that the ones serving the center lenses are more densely covered with sensors. This feature makes higher resolution zooming possible.

Dust Reduction

The present invention reduces the dust problem that plagues conventional cameras. With the present invention, no lens changes are needed. Therefore, the camera bodies and lenses are sealed. No dust enters to interfere with image quality. An inert gas, such as nitrogen or argon, may be sealed in the lens and sensor chambers within the enclosure 14, reducing oxidation. If argon is used, the camera gains some benefits from argon's thermal insulating capability. Temperature changes will be moderated.

Better Optical Performance

The optical performance of the present invention will be better than conventional cameras, since wide angle and telephoto lenses can be permanently fixed closer to the sensor than with SLRs. This is because there is no need for clearance of the SLR mirror. This improvement will enable higher-performance optical designs. New cameras based on the present invention will be smaller, lighter, sharper and faster. Lower light conditions will be less challenging.

The curved sensor makes the faster lens possible. Using LCD or other monitors as the viewfinder, similar to many current cameras, makes the image seen by the photographer exactly match the scene taken, with generally simultaneous switching from viewing to the taking; being done electronically instead of mechanically.

The present invention may be used in conjunction with a radically high speed lens, useable for both surveillance without flash (or without floods for motion) or fast action photography. This becomes possible again due to the non-planar sensor, and makes faster ranges like a f/0.7 or f/0.35 lens designs, and others, within practical reach, since the restraints posed by a flat sensor (or film) are now gone.

All these enhancements become practical since new lens formulas become possible. Current lens design for flat film and sensors must compensate for the "rainbow effect" or chromatic aberrations at the sensor edges, where light travels farther and refracts more. Current lens designs have to compensate for the reduced light intensity at the edges. These compensations limit the performance possibilities.

Since the camera lens and body are sealed, an inert gas like nitrogen or argon can be inserted during assembly, reducing corrosion and rust.

Mirrored Camera & Lens Combination

FIG. 21 reveals yet another embodiment of the invention, which includes a mirrored camera and lens combination 60. Primary and secondary objective lenses 62 and 64 gather incoming light 18. A first sensor 66 catches a centered image, while a second sensor 68 catches an image reflected from the mirror 70. A processor stitches together the "doughnut" image to the "doughnut hole" image.

FIG. 22 portrays another embodiment which is a variation of the embodiment shown in FIG. 21. The embodiment shown in FIG. 22 includes a sensor 72 mounted just outside the light path of the lens, with a mirror 70 that may be aspheric, may be asymmetrical, or may be both aspheric and asymmetrical, to send the image to that sensor without any obstructions to the light paths from the primary lens.

Mirror lenses are lighter, cheaper and, in applications for astronomy, far more practical, since the weight of glass makes large optics hard to hold up and maintain shapes. For conventional photography, mirrored lenses are fatter, shorter, cheaper and perform slightly worse than optical lenses. Purely mirrored lenses have an advantage of starting out with no chromatic aberrations, requiring fewer corrections. However, current mirror lenses use a second mirror centered in front of the lens, which reflects the image back into the camera. In telescopes, that same center spot is used to transmit the image sideways from the tube for viewing or capturing.

In the embodiment of the invention shown in FIG. 21, a center lens, front sensor and transmitter with back sensor is added. It uses a primary lens to direct the images onto the back mirror, which is curved. Camera and astronomy mirror lenses currently use this first objective lens to hold that center spot in place. The present invention also has this same center spot, but, adds a small lens facing outward and focusing the center image data onto a small sensor. That captured data, the "doughnut hole" data, is then combined with the other lens data reflected from the big mirror, the "doughnut" data. These two data sets are then combined to create an image without "bukeh," which is explained next. The inward side of the small center spot is, as with conventional mirror lenses, a mirror that reflects that larger image and data set back through the hole in the center of the larger mirror to be focused on a second sensor there.

All current mirror lenses have this problem called "bukeh" which is English for the Japanese word which translates as "fuzzy." This is prominent in the less focused areas of a photo, where the loss of the central image portion causes unusual blurring.

The embodiment shown in FIG. 21 eliminates "bukeh" by using the center spot as another lens. FIG. 21 shows how the front of that sensor captures the central axis rays, and combines them with the outer rays to form a complete image.

FIG. 22 shows a different embodiment that eliminates "bukeh." FIG. 22 uses an asymmetric, or tilted, or aspheric mirror, or a combination which reflects the image to a sensor that is outside of the light path. This arrangement avoids a center obstruction.

Rotating & Shifted Sensors

FIGS. 23A and 23B illustrate a series of alternative sensor arrays with sensor segments 32c separated by gaps 34, to facilitate easier sensor assembly. In this embodiment, a still camera which utilizes this sensor array takes two pictures in rapid succession. A first sensor array is shown in its original position 74, and is also shown in a rotated position 76. The position of the sensor arrays changes between the times the first and second pictures are taken. Software is used to recognize the images missing from the first exposure, and stitches that data in from the second exposure. The change in the sensor motion or direction shift may vary, depending on the pattern of the sensor facets.

A motion camera might do the same, or, in a different embodiment, might simply move the sensor and capture only the new image using the data from the prior position to fill in the gaps.

This method captures an image using a moveable sensor with gaps between the sensors in its array of sensors. This method makes fabricating much easier, because the spaces between segments become less critical. So, in one example, a square sensor in the center is surrounded by a row of eight more square sensors, which, in turn, is surrounded by another row of sixteen square sensors. The sensors are trimmed to fit the circular optical image, and each row curves in slightly more, creating the non-planar total sensor.

The camera takes one picture. The sensor immediately rotates or shifts slightly and a second image is immediately captured. Software can tell where the gaps were and stitches the new data from the second shot into the first. Or, depending on the sensor's array pattern, it may shift linearly in two dimensions, and possibly arc in the third dimension to match the curve.

This embodiment makes the production of complex sensors easier. The complex sensor, in this case, is a large sensor comprising multiple smaller sensors. When such a complex sensor is used to capture a focused image, the gaps between each sensor lose data that is essential to make the complete image. Small gaps reduce the severity of this problem, but smaller gaps make the assembly of the sensor more difficult. Larger gaps make assembly easier and more economical, but, create an even less complete image. The present invention, however, solves that problem by moving the sensor after the first image, and taking a second image quickly. This gives the complete image and software can isolate the data that is collected by the second image that came from the gaps and splice it into the first image. The same result may be achieved by a tilting lens element that shifts the image slightly during the two rapid sequence exposures. In one example shown in FIG. 23B, the sensor rotates back and forth. In an alternative embodiment, the sensor may shift sideways or diagonally, or may arc its curvature. In yet another embodiment, the sensor might rotate continuously, while the software combines the data into a complete image.

FIGS. 24A and 24B also shows a second set of sensors. The sensor is first shown in its original position 78, and is then shown in a displaced position 80.

Sensor Grid Patterns

FIGS. 25A, 25B, 25C and 25D reveal four alternative grid patterns for four alternative embodiments of sensors 82, 84, 86 and 88. The gaps 34 between the facets 32e, 32f, 32g and 32h enable the manufacturing step of forming a curved sensor.

Electrical Connections to Sensors

FIGS. 26, 27 and 28 provide views of alternative embodiments of electrical connections to sensors.

FIG. 26 shows a sensor 90 has a generally spiral-shaped electrical connector 92. The conductor is connected to the sensor at the point identified by reference character 94, and is connected to a signal processor at the point identified by reference character 96. This embodiment of an electrical connection may be used when the sensor is rotated slightly between a first and second, exposure, as illustrated in FIG. 23. This arrangement reduces the flexing of the conductor 92, extending its life. The processor may built into the sensor assembly.

FIG. 27 shows the back of a sensor 102 with an "accordion" shape conductor 100, which is joined to the sensor at point A and to a processor at point B. This embodiment may be used when the sensor is shifted or displaced between a first and second exposure, as illustrated in FIG. 24.

This type of connection, in addition to the coiled wire connection, makes a back and forth or rotating sensor connection durable.

FIG. 28 shows the back of a sensor 114 having generally radially extending conductors. The conductors each terminate in brush B which are able to contact a ring. The brushes move over and touch the ring, collecting an output from the rotating sensor, and then transmit the output to the processor at the center C. This embodiment may be used when the sensor is rotated between exposures. In addition, this connection makes another embodiment possible; a continuously rotating sensor. In that embodiment, the sensor rotates in one direction constantly. The software detects the gaps, and fills in the missing data from the prior exposure.

Wireless Connection

FIG. 29 offers a block diagram of a wireless connection 118. A sensor 12 is connected to a transmitter 120, which wirelessly sends signals to a receiver 122. The receiver is connected to a signal processor 124.

Image De-Stabilization

In another alternative embodiment of the invention, part of the optical train of the camera is intentionally destabilized during an exposure. This embodiment provides a method for restoring lost portions of an image due to the gaps between the facets of the sensor. This embodiment of the invention includes one or more gyros or inertial motion units.

When a picture is taken, the camera first takes an ordinary exposure without any special additional steps. The camera then takes a second exposure in rapid succession. During the second exposure, a gyro, inertial motion unit or some other means for intentionally creating movement is activated to intentionally de-stabilize the image by moving a lens, prism, mirror or sensor in the optical train. This intentional de-stabilization causes a slightly different image to be captured.

The first and second images are then compared to capture the portions of the image that the first exposure may have missed due to the gaps between the facets of the sensors. A final, complete image is then composed using the first and second exposures.

III. Summary of Features & Advantages

In summary, the advantages offered by the present invention include, but are not limited to:
High resolution digital zoom
Faster
Lighter
Cheaper
Longer focusing ranges
More reliable
Lower chromatic aberration
More accurate pixel resolution
Eliminate need for flash or floodlights
Zooming from wide angle to telephoto
SLRs no longer necessary IV. Applications & Implementations of the Invention Machine Vision Cameras Machine Vision Cameras operate robotically in some cases, and as production tools in other cases. Their ability to spot imperfections, such as flaws in a sheet of film being produced, a bottle only half filled, or a label misplaced, depends on reasonable resolution and color fidelity, often at high speeds. When implemented in accordance with the present invention, image quality improves, since the light rays at the edge hit the sensor at a right angle; just like the light rays at the center. Reflected light is reduced. This curved shape also balances light intensity across the sensor with less complex lenses. Chromatic aberration is also reduced at the edges, without requiring complicated lens designs, since the light rays going to the sensor's edges do not travel as far, reducing that "rainbow spread." Since incoming photons impinge upon the edge of the sensors at closer to a right angle, reflections tend to leave the camera back through the lens. Bleeding into the next pixel is also reduced. The incoming light is also more evenly balanced across the sensor. This is all accomplished without requiring excessive lens corrections, freeing the optical designer to concentrate more on resolution and contrast. This advantage holds for a traditional monocular machine vision camera, and, also applies to a stereo adaptation. The stereo adaptation might use sensors with alternating polarity and two lenses with different polarity. The stereo version might also use color filters on or in the two different lenses, with filtered sensors, creating a 3-D effect in black and white. All versions mentioned benefit from an ability to create faster lenses, so available light can be less intense while still capturing the visual data. Or, a lens designer may deliver higher contrast and resolution with truer colors, while having more speed than conventional lenses.

Long Distance Cameras

Some applications, like astronomy, wildlife photography, airborne, orbital and sports pictures use cameras with extreme telephoto lenses. When implemented in accordance with the present invention, the sensors for these cameras may often have less curvature since the light rays coming in are closer to parallel. However, the slight curvature in the sensor yields the same benefits for these optics designs. Without worrying about chromatic aberrations, changes in intensity across the sensor and bleeding under individual pixels into adjoining individual pixels at the edges, all design work can focus more on resolution and contrast, or speed, or both. In some cases, these cameras may benefit from capturing radiation that is outside the visible spectrum.

Close-Up Cameras

Most cameras cannot focus closer than a meter away with their normal lenses. To take closeup pictures, cameras with interchangeable lenses often have a selection of "macro" lenses that make it possible to get closer. They also can still take normal pictures of people nearby or even a distant horizon shot. The disadvantage, however, is that macro lenses are slow. In most lens lines, the macro lenses let less than a fourth as much light pass through as with their standard lenses. Since the present invention relieves the restrictions placed on normal lenses and macro lenses, by distributing the light evenly across the sensor and hitting the sensors at closer to an average of a right angles, new lens designs can concentrate on closer focusing without losing speed. Or, an optics designer may choose to stay slow as conventional macro lenses, but offer more resolution, contrast or color fidelity than ever before.

Superfast Cameras

These cameras use bigger lenses and apertures to capture more light. No artificial light is needed. This makes moonlight photography possible at shutter speeds that capture action without blurring. This is possible, for the first time, with the curved sensor, since lens designs are freed of the restriction imposed by flat sensors. Those restrictions are the needs to reduce chromatic aberrations at the edges. Sensor designs are also freed from the need to rebalance the light which is weaker at the edges of flat sensors. Sensor designs also are freed from worrying about acutely angled light undercutting pixels at the edges and bleeding into adjoining pixels, since, in accordance with the present invention, the light strikes them at closer to right angles. Optical design is freed to concentrate on capturing more light with these faster lenses.

High Performance Pocket Cameras

The most prevalent example of pocket cameras today is the wide-ranging photography being done by cell phones. The results are acceptable but not up to normal visual standards when enlarged. They then "pixilate" and get the "jaggies" when enlarged or cropped. Since the optics and sensor designers have to concentrate on chromatic aberrations and bleeding at the edges of the flat sensors, resolution suffers. Since the present invention relieves those problems, new pocket cameras will deliver higher quality images.

Night Vision Goggles & Cameras

These devices are not always restricted by chromatic aberration at the edge of the sensors, since, a narrow frequency often is used and amplified. When implemented in accordance with the present invention, higher resolution becomes possible near the edges since there's less bleeding between pixels than with a flat sensor. Stray light is reduced since, again, the average rays strike the sensor at closer to a right angle.

Light which is directly reflected off of a flat sensor bounces around inside a camera body. A small portion of these bouncing photons hit the sensor again, slightly fogging the image. With a curved sensor, the light which is directly reflected off the sensor tends to pass back out through the lens.

Microscopes

More light and better detail is seen when the present invention is implemented, as opposed to a flat sensor. This is due to reduced stray light, since the rays hit the sensor at closer to right angles. It is also due to reduction of chromatic aberration at the edges of the sensor, due to those rays traveling a shorter distance. And the need to balance the intensity of the light across the sensor is reduced. This lets the optics designs concentrate more on getting brighter and sharper images, with more magnification.

Medical Imaging Systems

Mini-cameras that go into arteries, the digestive tract, reproductive organs, etc. can produce better images with less size using the present invention. This is because being rounded, the present invention itself has less radius than its equivalent flat sensor. The optics can also be simpler while still delivering better images since less color aberration happens at the edges, bleeding between sensors at the edges is reduced and the incident, or stray, light created by rays hitting lens surfaces at angles is reduced. Physicians will see capillaries, polyps, cancers and ulcers in more detail.

Copier Cameras

The superior resolving and contrast possibilities of optics using the present invention makes copy machines with fewer moving parts and better images possible.

V. Additional Applications

Additional applications that may incorporate the present invention, include, but are not limited to:

Telescopes
Solar arrays
Binoculars and monoculars
Spectroscopy
Surveillance
RFID systems
Remote temperature sensing devices
IR chips
Surveying instruments
Magnetic Resonance Imaging

Scope of the Claims

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for providing a Curvilinear Sensor System that have been disclosed above are intended to educate the reader about preferred embodiments of the invention, and are not intended to constrain the limits of the invention or the scope of Claims.

LIST OF REFERENCE CHARACTERS

| | |
|---|---|
| 10 | Camera with curvilinear sensor |
| 12 | Curved sensor |
| 14 | Enclosure |
| 16 | Objective lens |
| 18 | Incoming light |
| 20 | Electrical output from sensor |
| 22 | Signal processor |
| 24 | User controls |
| 26 | Battery |
| 28 | Memory |
| 30 | Camera output |
| 32 | Facet |
| 34 | Gap between facets |
| 36 | Via |
| 38 | Wiring backplane |
| 40 | Curved sensor formed from adjoining petal-shaped segments |
| 42 | Petal-shaped segment |
| 44 | Camera monitor |
| 46 | Conventional sensor with generally uniform pixel density |
| 48 | Sensor with higher pixel density toward center |
| 50 | Pixel |
| 52 | Shade retracted |
| 54 | Shade extended |
| 56 | Multi-lens camera assembly |
| 58 | Objective lens |
| 60 | Mirrored camera/lens combination |
| 62 | Primary objective lens |
| 64 | Secondary objective lens |
| 66 | First sensor |
| 68 | Second sensor |
| 70 | Mirror |
| 72 | Side-mounted sensor |
| 74 | Sensor in original position |
| 76 | Sensor in rotated position |
| 78 | Sensor in original position |
| 80 | Sensor in displaced position |
| 82 | Alternative embodiment of sensor |
| 84 | Alternative embodiment of sensor |
| 86 | Alternative embodiment of sensor |
| 88 | Alternative embodiment of sensor |
| 90 | View of back side of one embodiment of sensor |
| 92 | Spiral-shaped conductor |
| 94 | Connection to sensor |
| 96 | Connection to processor |
| 98 | View of back side of one embodiment of sensor |
| 100 | Accordion-shaped conductor |
| 102 | Connection to sensor |
| 104 | Connection to processor |
| 106 | View of back side of one embodiment of sensor |
| 108 | Radial conductor |
| 110 | Brush |
| 112 | Brush contact point |
| 114 | Annular ring |
| 116 | Center of sensor, connection point to processor |
| 118 | Schematic view of wireless connection |
| 120 | Transmitter |
| 122 | Receiver |
| 124 | Processor |

What is claimed is:

1. An apparatus comprising:
a camera enclosure;
said camera enclosure including
an objective lens;
said objective lens being mounted on said camera enclosure;
said objective lens for collecting a stream of radiation; and
a curvilinear sensor;
said curvilinear sensor including a plurality of planar facets;
a wiring backplane disposed behind said curvilinear sensor;
each of said plurality of planar facets being connected to a via to connect said via to said wiring backplane;
said curvilinear sensor being mounted inside said camera enclosure;
said curvilinear sensor being aligned with said objective lens;
said curvilinear sensor having a portion which extends beyond a generally two-dimensional plane;
said curvilinear sensor having an output for recording an image;
said plurality of pixels are arranged on said curvilinear sensor in varying density.

2. An apparatus comprising:
a camera enclosure;
said camera enclosure including
an objective lens;
said objective lens being mounted on said camera enclosure;
said objective lens for collecting a stream of radiation; and
a curvilinear sensor;
said curvilinear sensor including a plurality of planar facets;
a wiring backplane disposed behind said curvilinear sensor;
each of said plurality of planar facets being connected to a via to connect said via to said wiring backplane;
said curvilinear sensor being mounted inside said camera enclosure;
said curvilinear sensor being aligned with said objective lens;
said curvilinear sensor having a portion which extends beyond a generally two-dimensional plane;
said curvilinear sensor having an output for recording an image;
said curvilinear sensor is configured to have a relatively higher concentration of pixels generally near the center of said curvilinear sensor.

3. An apparatus comprising:
a camera enclosure;
said camera enclosure including
an objective lens;
said objective lens being mounted on said camera enclosure;
said objective lens for collecting a stream of radiation; and
a curvilinear sensor;
said curvilinear sensor including a plurality of planar facets;
a wiring backplane disposed behind said curvilinear sensor;
each of said plurality of planar facets being connected to a via to connect said via to said wiring backplane;
said curvilinear sensor being mounted inside said camera enclosure;

said curvilinear sensor being aligned with said objective lens;
said curvilinear sensor having a portion which extends beyond a generally two-dimensional plane;
said curvilinear sensor having an output for recording an image;
said curvilinear sensor is configured to have a relatively lower concentration of pixels generally near an edge of said curvilinear sensor.

4. An apparatus as recited in claim 2, which:
said relatively high concentration of pixels generally near the center of said curvilinear sensor enables zooming into a telephoto shot using said relatively high concentration of pixels generally near the center of said curvilinear sensor only, while retaining relatively high image resolution.

5. An apparatus comprising:
a camera enclosure;
said camera enclosure including
an objective lens;
said objective lens being mounted on said camera enclosure;
said objective lens for collecting a stream of radiation;
a curvilinear sensor;
said curvilinear sensor including a plurality of planar facets;
a wiring backplane disposed behind said curvilinear sensor;
each of said plurality of planar facets being connected to a via to connect said via to said wiring backplane;
said curvilinear sensor being mounted inside said camera enclosure;
said curvilinear sensor being aligned with said objective lens;
said curvilinear sensor having a portion which extends beyond a generally two-dimensional plane;
said curvilinear sensor having an output for recording an image; and
a shade; said shade being disposed to generally move to block incoming light;
said shade being retracted so that it does not block incoming light when a wide angle image is sensed;
said shade being extended to block incoming extraneous light from non-image areas when a telephoto image is sensed.

6. An apparatus comprising:
a camera enclosure;
said camera enclosure including
an objective lens;
said objective lens being mounted on said camera enclosure;
said objective lens for collecting a stream of radiation;
a curvilinear sensor;
said curvilinear sensor including a plurality of planar facets;
a wiring backplane disposed behind said curvilinear sensor;
each of said plurality of planar facets being connected to a via to connect said via to said wiring backplane;
said curvilinear sensor being mounted inside said camera enclosure;
said curvilinear sensor being aligned with said objective lens;
said curvilinear sensor having a portion which extends beyond a generally two-dimensional plane;
said curvilinear sensor having an output for recording an image; and
a reflector plane;
said curvilinear sensor being disposed over said reflector plane;
said curvilinear sensor including an aperture;
said aperture for admitting said stream of radiation which passes through said aperture, reflects off of said reflector plane and is received by said curvilinear sensor.

7. An apparatus comprising:
a camera enclosure;
said camera enclosure including
an objective lens;
said objective lens being mounted on said camera enclosure;
said objective lens for collecting a stream of radiation;
a curvilinear sensor;
said curvilinear sensor including a plurality of planar facets;
a wiring backplane disposed behind said curvilinear sensor;
each of said plurality of planar facets being connected to a via to connect said via to said wiring backplane;
said curvilinear sensor being mounted inside said camera enclosure;
said curvilinear sensor being aligned with said objective lens;
said curvilinear sensor having a portion which extends beyond a generally two-dimensional plane;
said curvilinear sensor having an output for recording an image; and
a primary objective lens;
a mirror;
said curvilinear sensor having a convex shape and being disposed to catch a reflected image from said mirror;
a processor; said processor for stitching a doughnut image to a doughnut hole image; and
a secondary objective lens.

8. A method comprising the steps of:
providing a camera; said camera including a curvilinear sensor; said camera including an optical train; said curvilinear sensor including a plurality of facets generally bounded by a plurality of gaps; said camera including an optical train motion means for intentionally imparting movement to said optical train;
recording a first exposure;
activating said optical train motion means to intentionally impart movement to said optical train while said second exposure is taken;
taking a second exposure;
comparing said first and said second exposures to detect any missing portions of the desired image due to said plurality of gaps in said curvilinear sensor; and
composing a complete image using both said first and said second exposures.

9. A method as recited in claim 8, in which:
said plurality of facets are bent and joined to form a generally curved surface planar facets being bent and then joined to form a generally curved surface.

10. A method as recited in claim 8, in which:
said curvilinear sensor includes a wiring backplane disposed behind said curvilinear sensor.

11. A method as recited in claim 10, in which:
each of said plurality of facets is connected to a via to connect said via to said wiring backplane.

12. A method as recited in claim 8, in which:
said optical train motion means for intentionally imparting movement to said optical train imparts linear motion to said curvilinear sensor.

13. A method as recited in claim 8, in which:
said optical train motion means for intentionally imparting movement to said optical train imparts rotational motion to said curvilinear sensor.

14. A method as recited in claim 8, in which:
said curvilinear sensor provides digital zoom.

15. A method as recited in claim 8, in which:
said curvilinear sensor enables a high speed camera.

16. A method as recited in claim 8, in which:
said curvilinear sensor being used in a cellular telephone camera.

17. A method as recited in claim 8, in which:
said curvilinear sensor is configured to have a relatively higher concentration of pixels generally near the center of said curvilinear sensor.

18. A method as recited in claim 8, in which:
said curvilinear sensor is configured to have a relatively lower concentration of pixels generally near an edge of said curvilinear sensor.

19. A method as recited in claim 17, in which:
said relatively high concentration of pixels generally near the center of said curvilinear sensor enables zooming into a telephoto shot using said relatively high concentration of pixels generally near the center of said curvilinear sensor only, while retaining relatively high image resolution.

\* \* \* \* \*